United States Patent
Gou et al.

(10) Patent No.: US 10,750,538 B2
(45) Date of Patent: Aug. 18, 2020

(54) METHOD FOR PROCESSING LISTEN BEFORE TALK PARAMETER, METHOD FOR ADJUSTING CONTENTION WINDOW AND ASSOCIATED APPARATUSES

(71) Applicant: ZTE Corporation, Shenzhen, Guangdong (CN)

(72) Inventors: Wei Gou, Guangdong (CN); Feng Bi, Guangdong (CN); Yajun Zhao, Guangdong (CN); Xincai Li, Guangdong (CN); Ling Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/965,719

(22) Filed: Apr. 27, 2018

(65) Prior Publication Data
US 2019/0007972 A1 Jan. 3, 2019

Related U.S. Application Data

(63) Continuation of application No. PCT/CN2016/103788, filed on Oct. 28, 2016.

(30) Foreign Application Priority Data

Oct. 28, 2015 (CN) .......................... 2015 1 0715706

(51) Int. Cl.
*H04L 12/807* (2013.01)
*H04W 74/08* (2009.01)
(Continued)

(52) U.S. Cl.
CPC ......... *H04W 74/0816* (2013.01); *H04L 47/27* (2013.01); *H04W 16/14* (2013.01);
(Continued)

(58) Field of Classification Search
CPC ...................................................... H04L 47/27
See application file for complete search history.

(56) References Cited

U.S. PATENT DOCUMENTS

2008/0076465 A1* 3/2008 Larsson ................ H04W 28/18
455/522
2009/0129353 A1 5/2009 Ki et al.
(Continued)

FOREIGN PATENT DOCUMENTS

| CN | 104717687 A | 6/2015 |
|---|---|---|
| CN | 104812032 A | 7/2015 |
| CN | 104994591 A | 10/2015 |

OTHER PUBLICATIONS

International Search Report and Written Opinion dated Jan. 18, 2017 for International Application No. PCT/CN2016/103788, filed on Oct. 28, 2016 (8 pages).

(Continued)

*Primary Examiner* — Fahmida S Chowdhury
(74) *Attorney, Agent, or Firm* — Perkins Coie LLP

(57) ABSTRACT

The embodiments of the present disclosure provide a method for processing an LBT parameter, a method for adjusting a contention window and associated apparatuses. The method for processing an LBT parameter includes: generating, by a first station, an LBT parameter comprising a parameter used by the first station to perform LBT for unlicensed carriers and/or indicating a parameter used by a second station receiving the LBT parameter to perform LBT for the unlicensed carriers; and transmitting, by the first station, the LBT parameter. With the embodiments of the present disclosure, the problem associated with interference due to unlicensed carrier contention by neighboring stations can be solved, such that the interference between the neigh- (Continued)

A first station generates an LBT parameter including a parameter used by the first station to perform LBT for unlicensed carriers and/or indicating a parameter used by a second station receiving the LBT parameter to perform LBT for the unlicensed carriers. — S202

The first station transmits the LBT parameter. — S204 boring stations due to unlicensed carrier contention by the neighboring stations can be avoided.

12 Claims, 5 Drawing Sheets

(51) Int. Cl.
    *H04W 74/00*     (2009.01)
    *H04W 16/14*     (2009.01)
    *H04W 72/04*     (2009.01)
    *H04L 1/18*     (2006.01)

(52) U.S. Cl.
    CPC ..... *H04W 72/0446* (2013.01); *H04W 74/002* (2013.01); *H04W 74/0808* (2013.01); *H04L 1/1812* (2013.01); *H04L 1/1887* (2013.01)

(56) References Cited

U.S. PATENT DOCUMENTS

| | | | | |
|---|---|---|---|---|
| 2015/0365880 | A1* | 12/2015 | Malladi | ................ H04L 5/0053 370/312 |
| 2017/0171840 | A1* | 6/2017 | Mukherjee | ............ H04W 8/005 |
| 2018/0220420 | A1* | 8/2018 | Harada | ................. H04W 24/10 |
| 2018/0288790 | A1* | 10/2018 | Kim | ................. H04W 72/1278 |
| 2018/0288805 | A1* | 10/2018 | Bhorkar | ............ H04W 74/0808 |

OTHER PUBLICATIONS

Ericsson, "On Forward Compatibility of DL-only LAA Design," 3GPP TSG RAN WG1 Meeting #82bis, R1-156044, 2 pages, Malmo, Sweden, Oct. 2015.
Qualcomm Incorporated, "Multi-carrier LBT operation," 3GPP TSG RAN WG1 #82bis, R1-155724, 3 pages, Malmo, Sweden, Oct. 2015.
Samsung, "Discussion on LBT for UL transmission," 3GPP TSG RAN WG1 Meeting #82bis, R1-155461, 5 pages, Malmo, Sweden, Oct. 2015.
Supplementary Search Report dated May 24, 2019 for European Application No. 16859082.6, filed on Oct. 28, 2016 (13 pages).
Chinese Office Action dated Oct. 15, 2019 for Chinese Patent Application No. 201510715706.0, filed on Oct. 28, 2015 (12 pages).
NTT Docomo, Inc., "Views on DL LBT mechanism and contention window size adaptation," 3GPP TSG RAN WG1 Meeting #82, Beijing, China, R1-154403, 7 pages, Aug. 2015.
ZTE Corporation, "Contention window size adaptation for DL LBT in LAA," 3GPP TSG RAN WG1 Meeting #82bis, Malmo, Sweden, R1-155253, 3 pages, Oct. 2015.

* cited by examiner

METHOD FOR PROCESSING LISTEN BEFORE TALK PARAMETER, METHOD FOR ADJUSTING CONTENTION WINDOW AND ASSOCIATED APPARATUSES

CROSS REFERENCE TO RELATED APPLICATIONS

This application is a continuation of and claims priority to International Patent Application No. PCT/CN2016/103788, filed on Oct. 28, 2016, which claims the benefit of priority of Chinese Patent Application No. 201510715706.0, filed on Oct. 28, 2015. The entire contents of the before-mentioned patent applications are incorporated by reference as part of the disclosure of this application.

TECHNICAL FIELD

The present disclosure relates to communication technology, and more particularly, to a method for processing a Listen Before Talk (LBT) parameter, a method for adjusting a contention window and associated apparatuses.

BACKGROUND

Currently, Long Term Evolution (LTE) communication networks are deployed to operate in licensed carriers. With the development of LTE, some companies have proposed research topics on deployment of LTE in unlicensed carriers. For example, some companies believe that, with the rapid growth of data traffic, in near future the licensed carriers would not be sufficient to carry the huge amount of data brought by such rapid growth of traffic. It has been proposed to deploy LTE in unlicensed carriers, such that some of the data traffic in the licensed carriers can be offloaded to the unlicensed carriers, thereby mitigating the data traffic load due to the traffic growth. Meanwhile, the unlicensed carriers have the following characteristics. In one hand, the unlicensed carriers do not need to be purchased or the carrier resources have zero cost, so the unlicensed carriers free or inexpensive. On the other hand, the unlicensed carriers can be deployed by both individuals and companies and vendor devices can be used, so they have low admission requirements. Furthermore, the unlicensed carriers can be shared. When several different systems or several different operators of one single system operate in the unlicensed carriers, carrier efficiency can be improved by means of resource sharing.

While it is obviously advantageous to deploy LTE in the unlicensed carriers, there are problems in such deployment. For example, there are many radio access technologies, leading to problems such as difficulties in coordination across different communication standards and diversities in network topologies. Further, there are many radio access stations, leading to problems such as a large number of users, a difficult coordination and a high overhead in centralized management. As there are many radio access technologies, there will be various radio systems in the unlicensed carriers, which are difficult to coordinate and will cause severe interference. Hence, when the LTE is deployed in the unlicensed carriers, there will still be mutual interference between neighboring stations that are contending for the unlicensed carriers.

In order to solve these problems, when the LTE is deployed in the unlicensed carriers, it is required to support control of the unlicensed carriers. It is required by most countries to support a Listen Before Talk (LBT) mechanism when the system is deployed in the unlicensed carriers. With the LBT mechanism, it is possible to avoid mutual interference between neighboring systems that are using the unlicensed carriers simultaneously. Meanwhile, a contention back-off mechanism can be introduced optionally. That is, with the contention back-off mechanism, for neighboring system stations (typically neighboring transmitting nodes within one single system), it is possible to avoid the interference caused by neighboring transmitting nodes of the same system that are using the unlicensed carriers simultaneously.

At present, the LTE is working on researches on deployment of the LTE in a Licensed-Assisted Access (LAA) system. Most companies believe that a contention-based back-off mechanism will be adopted in a downlink in the LAA system for contending for access to an unlicensed carrier. For example, FIG. 1 is a flowchart illustrating an LBT mechanism in a cat4-based process (referring to specifications regarding cat4 in 3GPP TR 36.899). For an LBT mechanism in a cat2-based process (referring to specifications regarding cat2 in 3GPP TR 36.899), one single Clear Channel Assessment (CCA) having a fixed time length can be used. When a clear channel is detected, access to the unlicensed carrier is obtained. Alternatively, a number of successive CCAs each having a predefined time length can be performed. When the first CCA fails, the subsequent CCAs can be performed. The access to the unlicensed carrier can be obtained when any one of the CCAs is successful.

Further, it has been found in the researches that, while neighboring stations in one system can contend for the same unlicensed carriers, due to lack of a coordination mechanism, the neighboring stations contend for the unlicensed carriers independently from each other and thus there may be mutual interference between neighboring unlicensed carriers occupied by the neighboring stations due to adjacent frequency leakage.

There are currently no effective solutions to the problem in the related art associated with interference due to unlicensed carrier contention by neighboring stations.

SUMMARY

The embodiments of the present disclosure provide a method for processing an LBT parameter, a method for adjusting a contention window and associated apparatuses, capable of solving at least the problem associated with interference due to unlicensed carrier contention by neighboring stations.

According to an embodiment of the present disclosure, a method for processing a Listen Before Talk (LBT) parameter is provided. The method includes: generating, by a first station, an LBT parameter including a parameter used by the first station to perform LBT for unlicensed carriers and/or indicating a parameter used by a second station receiving the LBT parameter to perform LBT for the unlicensed carriers; and transmitting, by the first station, the LBT parameter.

Optionally, the LBT parameter includes at least one of: a maximum Contention Window (CW) value, a minimum CW value, a number of Clear Channel Assessments (CCAs) in a defer period, a random back-off value, unlicensed carrier information, time to start performing LBT, a maximum transmitting power, or a CCA energy detection threshold.

Optionally, the method further includes, subsequent to the first station generating the LBT parameter: performing, by the first station, LBT for the unlicensed carriers based on the LBT parameter; transmitting, by the first station, the LBT parameter to the second station scheduled by the first station;

or transmitting, by the first station, the LBT parameter to a plurality of second stations scheduled in one subframe, such that the LBT parameters configured for the second stations have the same Contention Window Size (CWS), the same random back-off value or the same number of 9 µs time slots in a defer period.

Optionally, the first station performing LBT for the unlicensed carriers based on the LBT parameter includes: performing, by the first station, LBT based on a cat4 process for an unlicensed carrier having the smallest CW value among the unlicensed carriers and performing LBT based on a cat2 process for other unlicensed carriers than the unlicensed carrier having the smallest CW value among the unlicensed carriers; or performing, by the first station, LBT based on the cat4 process for an unlicensed carrier having the largest CW value among the unlicensed carriers and performing LBT based on the cat2 process for other unlicensed carriers than the unlicensed carrier having the largest CW value among the unlicensed carriers.

Optionally, the method further includes, subsequent to the second station receiving the LBT parameter: performing, by the first station and the second station simultaneously, LBT based on a cat4 process for an unlicensed carrier having the smallest CW value among the unlicensed carriers and performing LBT based on a cat2 process for other unlicensed carriers than the unlicensed carrier having the smallest CW value among the unlicensed carriers; performing, by the second station, LBT based on the cat4 process for the unlicensed carrier having the smallest CW value among the unlicensed carriers, while performing LBT based on the cat2 process for other unlicensed carriers than the unlicensed carrier having the smallest CW value among the unlicensed carriers; performing, by the first station and the second station simultaneously, LBT based on the cat4 process for an unlicensed carrier having the largest CW value among the unlicensed carriers and performing LBT based on the cat2 process for other unlicensed carriers than the unlicensed carrier having the largest CW value among the unlicensed carriers; or performing, by the second station, LBT based on the cat4 process for the unlicensed carrier having the largest CW value among the unlicensed carriers, while performing LBT based on the cat2 process for other unlicensed carriers than the unlicensed carrier having the largest CW value among the unlicensed carriers.

Optionally, the first station performing LBT for the unlicensed carriers based on the LBT parameter includes: determining, by the first station, bursts to be aggregated and transmitted over the unlicensed carriers; and performing, by the first station, LBT based on a cat4 process for the unlicensed carriers in accordance with a first LBT level corresponding to a first burst having the highest Quality of Service (QoS) priority among the bursts, or performing, by the first station, LBT based on the cat4 process for the unlicensed carriers in accordance with a second LBT level corresponding to a second burst having the lowest QoS priority among the bursts.

Optionally, the first station performing LBT based on the cat4 process for the unlicensed carriers in accordance with the first LBT level corresponding to the first burst having the highest QoS priority among the bursts includes: performing, by the first station, LBT based on the cat4 process for a primary contention carrier of the unlicensed carriers in accordance with the first LBT level; or the first station performing LBT based on the cat4 process for the unlicensed carriers in accordance with the second LBT level corresponding to the second burst having the lowest QoS priority among the bursts includes: performing, by the first station, LBT based on the cat4 process for the primary contention carrier of the unlicensed carriers in accordance with the second LBT level.

Optionally, when the LBT parameter includes a CCA energy detection threshold, the first station generating the CCA energy detection threshold in the LBT parameter includes: determining, by the first station, a CCA energy detection threshold for each of the unlicensed carriers based on a use scheme of the respective unlicensed carriers. The use scheme includes a first use scheme in which the unlicensed carriers are used in a non-Carrier Aggregation (CA) mode and a second use scheme in which the unlicensed carriers are used in a CA mode.

Optionally, the second use scheme includes: carrier aggregation of the unlicensed carriers using one operating frequency point; or carrier aggregation of the unlicensed carriers using an operating frequency point corresponding to each of the unlicensed carriers.

Optionally, the first station performing LBT for the unlicensed carriers based on the LBT parameter includes: performing, by the first station, first LBT for the unlicensed carriers. The operation of performing the first LBT includes performing LBT based on a cat4 process for each of the unlicensed carriers individually.

Optionally, the first station determining a first CCA energy detection threshold for a first unlicensed carrier of the unlicensed carriers includes: determining, by the first station, the first CCA energy detection threshold as $TL=-75+(23-PH)+10 \log(W)$ or $TL=-73+(23-PH)+10 \log(W)$, where PH denotes a maximum transmitting power value for the first unlicensed carrier in dBm; and W denotes a bandwidth of the first unlicensed carrier in MHz.

Optionally, the first station performing LBT for the unlicensed carriers based on the LBT parameter includes: performing, by the first station, second LBT for the unlicensed carriers. The operation of performing the second LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the first station determining a second CCA energy detection threshold for a second unlicensed carrier of the unlicensed carriers includes: determining, by the first station, the second CCA energy detection threshold as $TL=-75+(23-PH)+10 \log(W)$ or $TL=-73+(23-PH)+10 \log(W)$, where PH denotes a maximum total transmitting power value for the unlicensed carriers in dBm; and W denotes a total bandwidth of the unlicensed carriers in MHz.

Optionally, the first station performing LBT for the unlicensed carriers based on the LBT parameter includes: performing, by the first station, the first LBT and the second LBT simultaneously for the unlicensed carriers.

Optionally, the method further includes, subsequent to the first station performing the first LBT for the unlicensed carriers: using, by the first station, an unlicensed carrier for which the first LBT has succeeded among the unlicensed carriers based on the first use scheme or the second use scheme. When the unlicensed carrier for which the first LBT has succeeded among the unlicensed carriers is used based on the second use scheme, a maximum transmitting power value for the unlicensed carrier for which the first LBT has succeeded among the unlicensed carriers is $PH-10 \log(C)$, where PH denotes a maximum total transmitting power value for the unlicensed carriers in dBm and C denotes a number of the unlicensed carriers.

Optionally, the method further includes, subsequent to the first station performing the second LBT for the unlicensed carriers: using, by the first station, the unlicensed carriers based on the second use scheme when the second LBT for the unlicensed carriers has succeeded. A maximum transmitting power value for each of the unlicensed carriers is $PH-10 \log(C)$, where PH denotes a maximum total transmitting power value for the unlicensed carriers in dBm and C denotes a number of the unlicensed carriers.

Optionally, the method further includes, subsequent to the first station performing the second LBT for the unlicensed carriers: using, by the first station, the unlicensed carriers based on the first use scheme when the second LBT for the unlicensed carriers has failed but the first LBT for a part of the unlicensed carriers has succeeded.

Optionally, the method further includes, when the part of the unlicensed carriers is one unlicensed carrier, a maximum transmitting power value for the one unlicensed carrier is $PH-10 \log(C)$, where PH denotes a maximum total transmitting power value for the unlicensed carriers in dBm and C denotes a number of the unlicensed carriers.

Optionally, the first station performing LBT for the unlicensed carriers based on the LBT parameter includes: performing, by the first station, third LBT for the unlicensed carriers. The operation of performing the third LBT includes performing LBT based on a cat4 process for one unlicensed carrier to be used as a primary contention carrier among the unlicensed carriers.

Optionally, the first station determining a third CCA energy detection threshold for the one unlicensed carrier to be used as the primary contention carrier among the unlicensed carriers includes: determining, by the first station, the third CCA energy detection threshold as $TL=-75+(23-PH)+10 \log(W)$ or $TL=-73+(23-PH)+10 \log(W)$, where PH denotes a maximum transmitting power value for the one unlicensed carrier to be used as the primary contention carrier among the unlicensed carriers in dBm; and W denotes a bandwidth of the one unlicensed carrier to be used as the primary contention carrier among the unlicensed carriers in MHz.

Optionally, the first station performing LBT for the unlicensed carriers based on the LBT parameter includes: performing, by the first station, fourth LBT for the unlicensed carriers. The operation of performing the fourth LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the first station determining a fourth CCA energy detection threshold for a fourth unlicensed carrier of the unlicensed carriers includes: determining, by the first station, the fourth CCA energy detection threshold as $TL=-75+(23-PH)+10 \log(W)$ or $TL=-73+(23-PH)+10 \log(W)$, where PH denotes a maximum total transmitting power value for the unlicensed carriers in dBm; and W denotes a total bandwidth of the unlicensed carriers in MHz.

Optionally, the first station performing LBT for the unlicensed carriers based on the LBT parameter includes: performing, by the first station, the third LBT and the fourth LBT simultaneously for the unlicensed carriers.

Optionally, the method further includes, subsequent to the first station performing the fourth LBT for the unlicensed carriers: using, by the first station, the unlicensed carriers based on the second use scheme when the fourth LBT for the unlicensed carriers has succeeded. A maximum transmitting power value for each of the unlicensed carriers is $PH-10 \log(C)$, where PH denotes a maximum total transmitting power value for the unlicensed carriers in dBm and C denotes a number of the unlicensed carriers.

Optionally, the method further includes, subsequent to the first station performing the fourth LBT for the unlicensed carriers: using, by the first station, the unlicensed carrier to be used as the primary contention carrier among the unlicensed carriers based on the first use scheme when the fourth LBT for the unlicensed carriers has failed but the third LBT for the unlicensed carrier to be used as the primary contention carrier among the unlicensed carriers has succeeded.

According to another embodiment of the present disclosure, an apparatus applied in a first station for processing a Listen Before Talk (LBT) parameter is provided. The apparatus includes: a generating module configured to generate an LBT parameter including a parameter used by the first station to perform LBT for unlicensed carriers and/or indicating a parameter used by a second station receiving the LBT parameter to perform LBT for the unlicensed carriers; and a transmitting module configured to transmit the LBT parameter.

Optionally, the apparatus further includes a performing module configured to: perform LBT for the unlicensed carriers based on the LBT parameter; transmit the LBT parameter to the second station scheduled by the first station; or transmit the LBT parameter to a plurality of second stations scheduled in one subframe, such that the LBT parameters configured for the second stations have the same Contention Window Size (CWS), the same random back-off value or the same number of 9 μs time slots in a defer period.

Optionally, the performing module is configured to: perform LBT based on a cat4 process for an unlicensed carrier having the smallest CW value among the unlicensed carriers and perform LBT based on a cat2 process for other unlicensed carriers than the unlicensed carrier having the smallest CW value among the unlicensed carriers; or perform LBT based on the cat4 process for an unlicensed carrier having the largest CW value among the unlicensed carriers and perform LBT based on the cat2 process for other unlicensed carriers than the unlicensed carrier having the largest CW value among the unlicensed carriers.

Optionally, the performing module includes: a first determining unit configured to determine bursts to be aggregated and transmitted over the unlicensed carriers; and a first performing unit configured to perform LBT based on a cat4 process for the unlicensed carriers in accordance with a first LBT level corresponding to a first burst having the highest Quality of Service (QoS) priority among the bursts, or perform LBT based on the cat4 process for the unlicensed carriers in accordance with a second LBT level corresponding to a second burst having the lowest QoS priority among the bursts.

Optionally, the generating module includes: a second determining unit configured to determine, when the LBT parameter includes a Clear Channel Assessment (CCA) energy detection threshold, a CCA energy detection threshold for each of the unlicensed carriers based on a use scheme of the respective unlicensed carriers. The use scheme includes a first use scheme in which the unlicensed carriers are used in a non-Carrier Aggregation (CA) mode and a second use scheme in which the unlicensed carriers are used in a CA mode.

Optionally, the performing module includes: a second performing unit configured to perform first LBT for the unlicensed carriers. The operation of performing the first LBT includes performing LBT based on a cat4 process for each of the unlicensed carriers individually.

Optionally, the second determining unit is configured to: determine a first CCA energy detection threshold for a first unlicensed carrier of the unlicensed carriers as TL=−75+(23−PH)+10 log(W) or TL=−73+(23−PH)+10 log(W), where PH denotes a maximum transmitting power value for the first unlicensed carrier in dBm; and W denotes a bandwidth of the first unlicensed carrier in MHz.

Optionally, the performing module includes: a third performing unit configured to perform second LBT for the unlicensed carriers. The operation of performing the second LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the second determining unit is configured to: determine a second CCA energy detection threshold for a second unlicensed carrier of the unlicensed carriers as TL=−75+(23−PH)+10 log(W) or TL=−73+(23−PH)+10 log(W), where PH denotes a maximum total transmitting power value for the unlicensed carriers in dBm; and W denotes a total bandwidth of the unlicensed carriers in MHz.

Optionally, the performing module includes: a fourth performing unit configured to perform the first LBT and the second LBT simultaneously for the unlicensed carriers.

Optionally, the apparatus further includes: a first using module configured to use an unlicensed carrier for which the first LBT has succeeded among the unlicensed carriers based on the first use scheme or the second use scheme. When the unlicensed carrier for which the first LBT has succeeded among the unlicensed carriers is used based on the second use scheme, a maximum transmitting power value for the unlicensed carrier for which the first LBT has succeeded among the unlicensed carriers is PH−10 log(C), where PH denotes a maximum total transmitting power value for the unlicensed carriers in dBm and C denotes a number of the unlicensed carriers.

Optionally, the apparatus further includes: a second using module configured to use the unlicensed carriers based on the second use scheme when the second LBT for the unlicensed carriers has succeeded. A maximum transmitting power value for each of the unlicensed carriers is PH−10 log(C), where PH denotes a maximum total transmitting power value for the unlicensed carriers in dBm and C denotes a number of the unlicensed carriers.

Optionally, the apparatus further includes: a third using module configured to use the unlicensed carriers based on the first use scheme when the second LBT for the unlicensed carriers has failed but the first LBT for a part of the unlicensed carriers has succeeded.

Optionally, the performing module includes: a fifth performing unit configured to perform third LBT for the unlicensed carriers. The operation of performing the third LBT includes performing LBT based on a cat4 process for one unlicensed carrier to be used as a primary contention carrier among the unlicensed carriers.

Optionally, the second determining unit is configured to: determine a third CCA energy detection threshold for the one unlicensed carrier to be used as the primary contention carrier among the unlicensed carriers as TL=−75+(23−PH)+10 log(W) or TL=−73+(23−PH)+10 log(W), where PH denotes a maximum transmitting power value for the one unlicensed carrier to be used as the primary contention carrier among the unlicensed carriers in dBm; and W denotes a bandwidth of the one unlicensed carrier to be used as the primary contention carrier among the unlicensed carriers in MHz.

Optionally, the performing module includes: a sixth performing unit configured to perform fourth LBT for the unlicensed carriers. The operation of performing the fourth LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the second determining unit is configured to: determine a fourth CCA energy detection threshold for a fourth unlicensed carrier of the unlicensed carriers as TL=−75+(23−PH)+10 log(W) or TL=−73+(23−PH)+10 log(W), where PH denotes a maximum total transmitting power value for the unlicensed carriers in dBm; and W denotes a total bandwidth of the unlicensed carriers in MHz.

Optionally, the performing module includes: a seventh performing unit configured to perform the third LBT and the fourth LBT simultaneously for the unlicensed carriers.

Optionally, the apparatus further includes: a fourth using module configured to use the unlicensed carriers based on the second use scheme when the fourth LBT for the unlicensed carriers has succeeded. A maximum transmitting power value for each of the unlicensed carriers is PH−10 log(C), where PH denotes a maximum total transmitting power value for the unlicensed carriers in dBm and C denotes a number of the unlicensed carriers.

Optionally, the apparatus further includes: a fifth using module configured to use the unlicensed carrier to be used as the primary contention carrier among the unlicensed carriers based on the first use scheme when the fourth LBT for the unlicensed carriers has failed but the third LBT for the unlicensed carrier to be used as the primary contention carrier among the unlicensed carriers has succeeded.

Optionally, the LBT parameter includes at least one of: a maximum Contention Window (CW) value, a minimum CW value, a number of Clear Channel Assessments (CCAs) in a defer period, a random back-off value, unlicensed carrier information, time to start performing LBT, a maximum transmitting power, or a CCA energy detection threshold.

According to a further embodiment of the present disclosure, a computer storage medium is provided. The computer storage medium stores a computer program for performing the above method for processing a Listen Before Talk (LBT) parameter.

According to the embodiments of the present disclosure, a first station generates an LBT parameter including a parameter used by the first station to perform LBT for unlicensed carriers and/or indicating a parameter used by a second station receiving the LBT parameter to perform LBT for the unlicensed carriers. The first station transmits the LBT parameter. With the embodiments of the present disclosure, the problem associated with interference due to unlicensed carrier contention by neighboring stations can be solved, such that the interference between the neighboring stations due to unlicensed carrier contention by the neighboring stations can be avoided.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures.

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Figure 1:
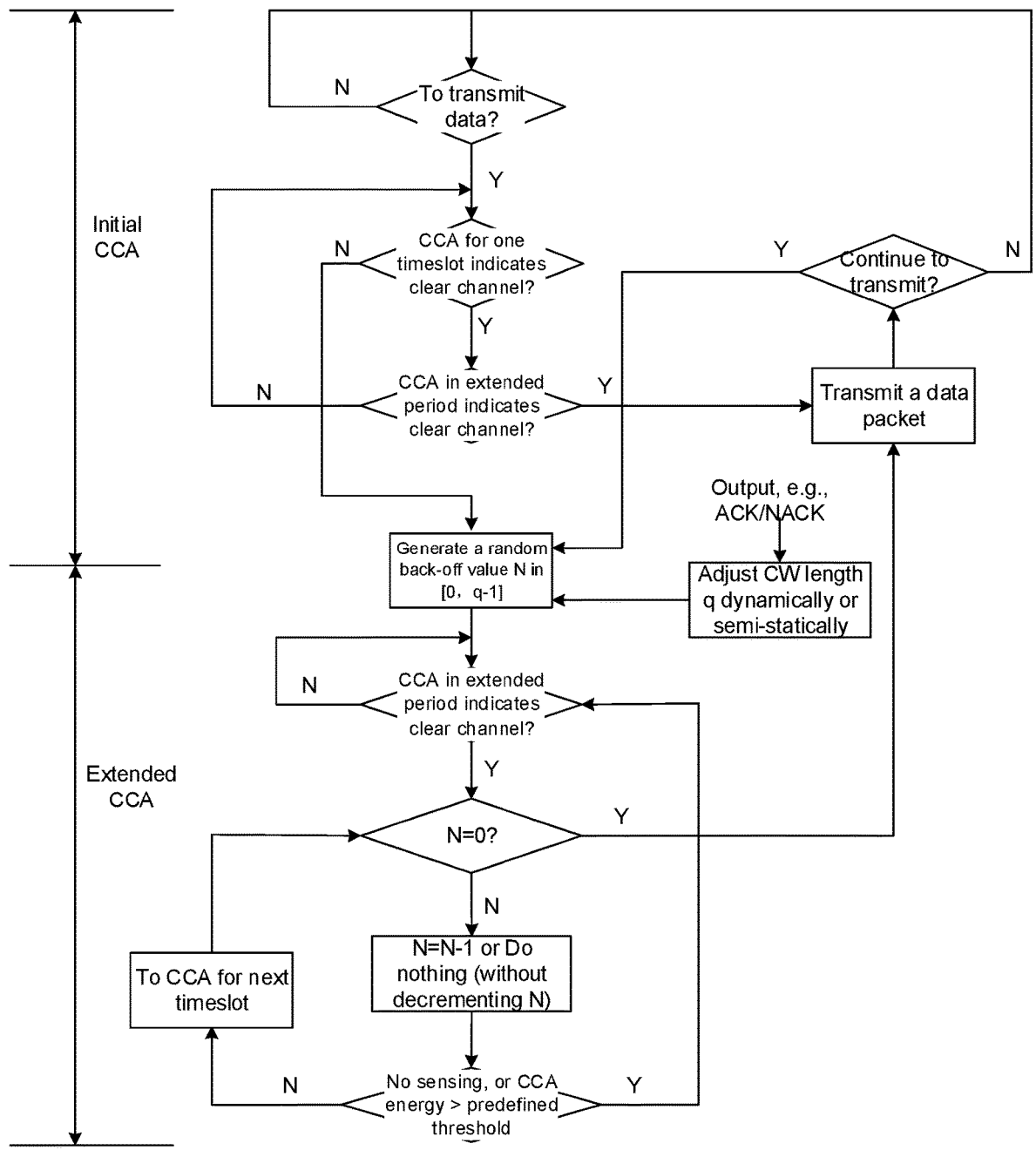
FIG. 1 is a flowchart illustrating an LBT mechanism based on a cat4 process according to a related art.
Figure 2:
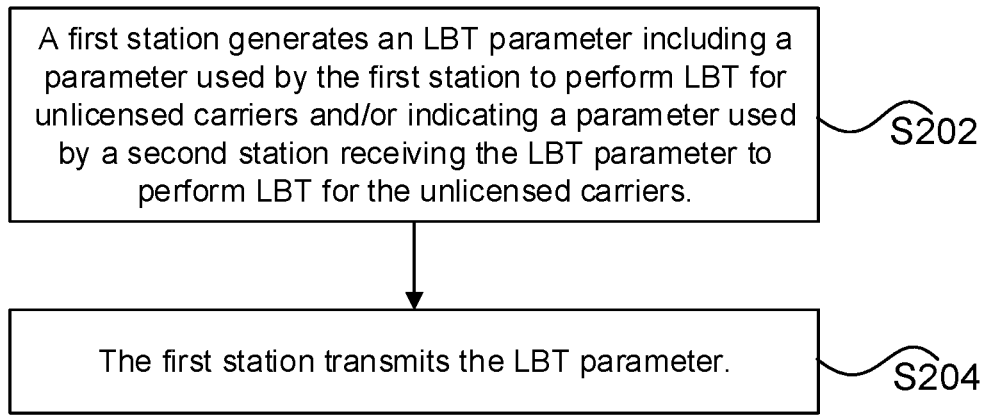
FIG. 2 is a flowchart illustrating a method for processing an LBT parameter according to an embodiment of the present disclosure.

In an embodiment, a method for processing an LBT parameter is provided. FIG. 2 is a flowchart illustrating a method for processing an LBT parameter according to an embodiment of the present disclosure. As shown in FIG. 2, the method includes the following steps.

At step S202, a first station generates an LBT parameter including a parameter used by the first station to perform LBT for unlicensed carriers and/or indicating a parameter used by a second station receiving the LBT parameter to perform LBT for the unlicensed carriers.

At step S204, the first station transmits the LBT parameter.

With the above steps, the first station transmits the generated LBT parameter to its neighboring station, the second station. The first and second stations start performing LBT simultaneously based on the LBT parameter and can use the same LBT configuration parameter. In this way, both stations can perform LBT simultaneously and can get access simultaneously. The second station can adjust the LBT parameter of its own based on the LBT parameter of the first station, so as to avoid interference between the first and second stations. That is, with the above steps, the problem associated with interference due to unlicensed carrier contention by neighboring stations can be solved, such that the interference between the neighboring stations due to unlicensed carrier contention by the neighboring stations can be avoided.

Optionally, the above first and second stations can be devices that contend for and use the unlicensed carriers, e.g., base stations or User Equipments (UEs). For example, a base station can transmit the LBT parameter to its neighboring base station via X2 interface, S1 interface or air interface signaling. As another example, a base station can transmit the LBT parameter to a UE via air interface signaling.

Optionally, the above LBT parameter can include, but not limited to, at least one of: a maximum Contention Window (CW) value, a minimum CW value, a number of Clear Channel Assessments (CCAs) in a defer period, a random back-off value, unlicensed carrier information (e.g., carrier identifiers), time to start performing LBT, a maximum transmitting power, or a CCA energy detection threshold. Here, the maximum CW value, the minimum CW value, the number of CCAs in the defer period, the random back-off value, the time to start performing LBT, the maximum transmitting power or the CCA energy detection threshold can be configured for each of the unlicensed carriers individually or for some or all of the unlicensed carriers uniformly.

Optionally, after generating the LBT parameter, the first station can perform LBT for the unlicensed carriers based on the LBT parameter. Alternatively, the first station can transmit the LBT parameter to the second station scheduled by the first station. Alternatively, the first station can transmit the LBT parameter to a plurality of second stations scheduled in one subframe, such that the LBT parameters configured for the second stations have the same Contention Window Size (CWS), the same random back-off value or the same number of 9 µs time slots in a defer period.

Optionally, after the above step S202, the first station can perform LBT for the unlicensed carriers by: performing LBT based on a cat4 process for an unlicensed carrier having the smallest CW value among the unlicensed carriers and performing LBT based on a cat2 process for other unlicensed carriers than the unlicensed carrier having the smallest CW value among the unlicensed carriers; or performing LBT based on the cat4 process for an unlicensed carrier having the largest CW value among the unlicensed carriers and performing LBT based on the cat2 process for other unlicensed carriers than the unlicensed carrier having the largest CW value among the unlicensed carriers. That is, with the above step, the LBT based on the cat4 or cat2 process can be performed for the unlicensed carriers depending on the CW values of the unlicensed carriers, thereby improving the flexibility of the system.

Optionally, after the second station has received the LBT parameter transmitted from the first station, the second station, or both the first and second stations, can perform LBT based on the LBT parameter.

For example, the first station and the second station can simultaneously perform LBT based on the cat4 process for an unlicensed carrier having the smallest CW value among the unlicensed carriers and performing LBT based on the cat2 process for other unlicensed carriers than the unlicensed carrier having the smallest CW value among the unlicensed carriers. Alternatively, the second station can perform LBT based on the cat4 process for the unlicensed carrier having the smallest CW value among the unlicensed carriers, while performing LBT based on the cat2 process for other unlicensed carriers than the unlicensed carrier having the smallest CW value among the unlicensed carriers. Alternatively, the first station and the second station can simultaneously perform LBT based on the cat4 process for an unlicensed carrier having the largest CW value among the unlicensed carriers and performing LBT based on the cat2 process for other unlicensed carriers than the unlicensed carrier having the largest CW value among the unlicensed carriers. Alternatively, the second station can perform LBT based on the cat4 process for the unlicensed carrier having the largest CW value among the unlicensed carriers, while performing LBT based on the cat2 process for other unlicensed carriers than the unlicensed carrier having the largest CW value among the unlicensed carriers. That is, with the above step, the LBT processes performed by the first and second stations can be synchronized, such that the problem associated with interference due to unlicensed carrier contention by neighboring stations can be solved and the interference between the neighboring stations due to unlicensed carrier contention by the neighboring stations can be avoided.

Optionally, after the above step S202, the first station can determine bursts to be aggregated and transmitted over the unlicensed carriers. Then, the first station can perform LBT based on the cat4 process for the unlicensed carriers in accordance with a first LBT level corresponding to a first burst having the highest Quality of Service (QoS) priority among the bursts. In this way, the burst having the highest QoS priority can be prioritized as much as possible in the contention for the unlicensed carrier resources. Alternatively, after the step S202, the first station can perform LBT for the unlicensed carriers based on the LBT parameter by performing LBT based on the cat4 process for the unlicensed carriers in accordance with a second LBT level corresponding to a second burst having the lowest QoS priority among the bursts. In this way, all the bursts can contend for the unlicensed carrier resources if possible.

For example, when the first station determines that bursts (i.e., the above bursts) are to be aggregated and transmitted in a plurality of unlicensed carriers, it performs multi-carrier contention for the unlicensed carrier aggregation based on the LBT level corresponding to the highest QoS traffic in the bursts (LBT based on the cat4 process is preferred).

For example, when the first station determines that bursts (i.e., the above bursts) are to be aggregated and transmitted in a plurality of unlicensed carriers, it performs multi-carrier contention for the unlicensed carrier aggregation based on the LBT level corresponding to the lowest QoS traffic in the bursts (LBT based on the cat4 process is preferred).

Optionally, the first station performing LBT based on the cat4 process for the unlicensed carriers in accordance with the first LBT level corresponding to the first burst having the highest QoS priority among the bursts includes: performing, by the first station, LBT based on the cat4 process for a primary contention carrier of the unlicensed carriers in accordance with the first LBT level.

Optionally, the first station performing LBT based on the cat4 process for the unlicensed carriers in accordance with the second LBT level corresponding to the second burst having the lowest QoS priority among the bursts includes: performing, by the first station, LBT based on the cat4 process for the primary contention carrier of the unlicensed carriers in accordance with the second LBT level.

Optionally, in this embodiment, a scheme for determining and using the CCA energy detection threshold is also provided.

For example, when the LBT parameter includes the CCA energy detection threshold, in the step S202, the first station can determine a CCA energy detection threshold for each of the unlicensed carriers based on a use scheme of the respective unlicensed carriers. Here, the use scheme includes a first use scheme in which the unlicensed carriers are used in a non-CA mode (i.e., data is transmitted independently in each unlicensed carrier) and a second use scheme in which the unlicensed carriers are used in a CA mode. In this way, different CCA energy detection thresholds can be configured for the non-CA mode and the CA mode of the unlicensed carriers. For example, the CCA energy detection threshold for the CA mode can be set to be lower than that for the non-CA mode, such that the success rate for the first station to use the unlicensed carriers in the CA mode can be increased.

Optionally, the above second use scheme (i.e., the CA mode) can include: carrier aggregation of the unlicensed carriers using one operating frequency point; or carrier aggregation of the unlicensed carriers using an operating frequency point corresponding to each of the unlicensed carriers.

A. When the first station performs LBT for the unlicensed carriers based on the LBT parameter, it can perform first LBT for the unlicensed carriers. The operation of performing the first LBT includes performing LBT based on a cat4 process for each of the unlicensed carriers individually. This can be applied in a scenario in which the unlicensed carriers are used in the first use scheme or a scenario in which the unlicensed carriers are used in the second use scheme.

Here, the first station can determine a first CCA energy detection threshold for a particular unlicensed carrier (e.g., denoted as a first unlicensed carrier) of the unlicensed carriers as $TL=-75+(23-PH)+10\ \log(W)$ or $TL=-73+(23-PH)+10\ \log(W)$, where PH denotes a maximum transmitting power value for the first unlicensed carrier in dBm; and W denotes a bandwidth of the first unlicensed carrier in MHz.

Optionally, when the first station performs LBT for the unlicensed carriers based on the LBT parameter, it can perform second LBT for the unlicensed carriers. The operation of performing the second LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers. This can be applied in a scenario in which the unlicensed carriers are used in the second use scheme.

Here, the first station can determine a second CCA energy detection threshold for a particular unlicensed carrier (e.g., denoted as a second unlicensed carrier) of the unlicensed carriers as $TL=-75+(23-PH)+10\ \log(W)$ or $TL=-73+(23-PH)+10\ \log(W)$, where PH denotes a maximum total transmitting power value for all the unlicensed carriers in dBm; and W denotes a total bandwidth of all the unlicensed carriers in MHz.

Optionally, the first station can attempt to perform the first LBT and the second LBT simultaneously for the unlicensed carriers.

Optionally, after the first station has performed the first LBT for the unlicensed carriers, it can use an unlicensed carrier for which the first LBT has succeeded among the unlicensed carriers based on the first use scheme or the second use scheme. When the unlicensed carrier for which the first LBT has succeeded among the unlicensed carriers is used based on the second use scheme, a maximum transmitting power value for the unlicensed carrier for which the first LBT has succeeded among the unlicensed carriers is PH−10 log(C), where PH denotes a maximum total transmitting power value for the unlicensed carriers in dBm and C denotes a number of the unlicensed carriers.

Optionally, after the first station has performed the second LBT for the unlicensed carriers, it can use the unlicensed carriers based on the second use scheme when the second LBT for the unlicensed carriers has succeeded. A maximum transmitting power value for each of the unlicensed carriers is PH−10 log(C), where PH denotes a maximum total transmitting power value for the unlicensed carriers in dBm and C denotes a number of the unlicensed carriers.

Optionally, after the first station has performed the second LBT for the unlicensed carriers, it can use the unlicensed carriers based on the first use scheme when the second LBT for the unlicensed carriers has failed but the first LBT for a part of the unlicensed carriers has succeeded.

Optionally, when the part of the unlicensed carriers is one unlicensed carrier, a maximum transmitting power value for the one unlicensed carrier is PH−10 log(C), where PH denotes a maximum total transmitting power value for the unlicensed carriers in dBm and C denotes a number of the unlicensed carriers.

For example, when a station contends for a plurality of unlicensed carriers, two LBT types and their corresponding CCA energy detection thresholds can be as follows.

Type 1: The station performs LBT, preferably LBT cat4, for each of the plurality of unlicensed carriers independently. If the contention succeeds, it can transmit in each of the unlicensed carriers independently. Let the maximum transmitting power (or a fixed power can be used, as applicable below) of each unlicensed carrier be PH=23 dBm, a CCA energy detection threshold is TL=−75+(23−PH)+10 log(W) =−62 dBm, where W denotes a bandwidth of each unlicensed carrier (e.g., assumed to be 20 MHz).

Type 2: The station performs LBT (cat4) for a primary contention unlicensed carrier and fast LBT (cat2) for a secondary contention unlicensed carrier. If the contention succeeds, a number of unlicensed carriers will be aggregated for transmission. The maximum total transmitting power is PH=23 dBm and the maximum transmitting power of each unlicensed carrier is P=23−10 log(C)=20 dBm, where C is the number of the aggregated unlicensed carriers. A CCA energy detection threshold is TL=−75+(23−PH)+10 log(W) =−62+3=−59 dBm, where W is the total aggregated bandwidth (e.g., assumed to be two 20 MHz carriers).

Optionally, the statin can perform the above Type 1 LBT and Type 2 LBT simultaneously.

Optionally, when the Type 1 LBT has succeeded, the station can allow transmission according to Type 2 (i.e., in CA mode).

Optionally, when the Type 2 LBT has succeeded, a number of unlicensed carriers are occupied simultaneously, with the maximum transmitting power of each carrier being 20 dBm.

Optionally, if the Type 2 LBT has failed but the Type 1 LBT for a part of the unlicensed carriers has succeeded in the contention, the part of the unlicensed carriers is be occupied, with the maximum transmitting power of each carrier in the part of the unlicensed carriers being 23 dBm.

As another example, when a station contends for a plurality of unlicensed carriers, two LBT types and their corresponding CCA energy detection thresholds can be as follows.

Type 1: The station performs LBT cat4 for each of the plurality of carriers independently. Assuming that the plurality of carriers is aggregated for transmission, the maximum transmitting power of each carrier to be used by the station is PH=20 dBm, a CCA energy detection threshold is TL=−75+(23−PH)+10 log(W)=−59 dBm, where W denotes a bandwidth of each unlicensed carrier (e.g., assumed to be 20 MHz).

Type 2: The station performs LBT cat4 for a primary contention carrier and fast LBT (cat2) for a secondary contention carrier. Assuming that the maximum total transmitting power of the primary contention carrier and the secondary contention carrier is PH=23 dBm, the maximum transmitting power of each unlicensed carrier is P=23−10 log(C)=20 dBm, where C is the number of the aggregated unlicensed carriers. A CCA energy detection threshold is TL=−75+(23−PH)+10 log(W)=−59 dBm, where W is the total aggregated bandwidth (e.g., assumed to be two 20 MHz carriers).

Optionally, the statin can perform the above Type 1 LBT and Type 2 LBT simultaneously. Alternatively, the station can perform one of the Type 1 LBT and Type 2 LBT selectively.

Optionally, when the Type 1 LBT processes performed independently for the primary carrier and the secondary carrier have both succeeded, the carriers are occupied simultaneously, with the maximum transmitting power of each carrier being 20 dBm.

Optionally, when the Type 2 LBT has succeeded, the primary contention carrier and the secondary contention carrier are occupied simultaneously, with the maximum transmitting power of each carrier being 20 dBm.

Optionally, if the Type 1 LBT is configured to be performed and the LBT has succeeded for only one carrier, the one carrier is occupied, with the maximum transmitting power of the carrier being 20 dBm. Here, power boosting can be applied, such that the maximum transmitting power of the carrier can be 23 dBm.

B. When the first station performs LBT for the unlicensed carriers based on the LBT parameter, it can perform third LBT for the unlicensed carriers. The operation of performing the third LBT includes performing LBT based on a cat4 process for one unlicensed carrier to be used as a primary contention carrier among the unlicensed carriers. This can be applied in a scenario in which the unlicensed carriers are used in the second use scheme.

Here, the first station can determine a third CCA energy detection threshold for the one unlicensed carrier to be used as the primary contention carrier among the unlicensed carriers as TL=−75+(23−PH)+10 log(W) or TL=−73+(23−PH)+10 log(W), where PH denotes a maximum transmitting power value for the one unlicensed carrier to be used as the primary contention carrier among the unlicensed carriers in dBm; and W denotes a bandwidth of the one unlicensed carrier to be used as the primary contention carrier among the unlicensed carriers in MHz.

Optionally, when the first station performs LBT for the unlicensed carriers based on the LBT parameter, it can perform fourth LBT for the unlicensed carriers. The operation of performing the fourth LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers. This can be applied in a scenario in which the unlicensed carriers are used in the second use scheme.

Here, the first station can determining a fourth CCA energy detection threshold for a particular unlicensed carrier (denoted as a fourth unlicensed carrier) of the unlicensed carriers as TL=−75+(23−PH)+10 log(W) or TL=−73+(23−PH)+10 log(W), where PH denotes a maximum total transmitting power value for all the unlicensed carriers in dBm; and W denotes a total bandwidth of all the unlicensed carriers in MHz.

Optionally, the first station can attempt to perform the third LBT and the fourth LBT simultaneously for the unlicensed carriers.

Optionally, after the first station has performed the fourth LBT for the unlicensed carriers, the first station can use the unlicensed carriers based on the second use scheme when the fourth LBT for the unlicensed carriers has succeeded. A maximum transmitting power value for each of the unlicensed carriers is PH−10 log(C), where PH denotes a maximum total transmitting power value for the unlicensed carriers in dBm and C denotes a number of the unlicensed carriers.

Optionally, after the first station has performed the fourth LBT for the unlicensed carriers, the first station can use the unlicensed carrier to be used as the primary contention carrier among the unlicensed carriers based on the first use scheme when the fourth LBT for the unlicensed carriers has failed but the third LBT for the unlicensed carrier to be used as the primary contention carrier among the unlicensed carriers has succeeded.

For example, when a station contends for a plurality of unlicensed carriers, two LBT types and their corresponding CCA energy detection thresholds can be as follows.

Type 1: Only one unlicensed carrier is used as a primary contention carrier and LBT cat4 can be performed independently in the unlicensed carrier. Assuming that the primary contention carrier is transmitted independently and the maximum transmitting power of the primary contention carrier to be used by the station is PH=23 dBm, a CCA energy detection threshold is TL=−75+(23−PH)+10 log(W)=−62 dBm, where W denotes a bandwidth of each unlicensed carrier (e.g., assumed to be 20 MHz).

Type 2: LBT cat4 is performed for a primary contention carrier and fast LBT (cat2) is performed for a secondary contention carrier. Assuming that the maximum total transmitting power of the primary contention carrier and the secondary contention carrier is PH=23 dBm, the maximum transmitting power of each unlicensed carrier is P=23-10 log(C)=20 dBm, where C is the number of the aggregated unlicensed carriers. A CCA energy detection threshold is TL=−75+(23−PH)+10 log(W)=−59 dBm, where W is the total aggregated bandwidth (e.g., assumed to be two 20 MHz carriers).

Optionally, the statin can perform the above Type 1 LBT and Type 2 LBT simultaneously.

Optionally, when the Type 2 LBT has succeeded, two carriers are occupied simultaneously, with the maximum transmitting power of each carrier being 20 dBm.

Optionally, if the Type 2 LBT has failed and the Type 1 LBT for the primary contention carrier has succeeded, the primary contention carrier is occupied. The transmitting power of the primary contention carrier is 23 dBm. Moreover, the secondary contention carrier will not be occupied alone.

With the description of the above embodiments, it will be apparent to those skilled in the art that the method according to the above embodiments can be implemented by means of software plus a necessary general-purpose hardware platform. Of course it can be implemented in hardware, but in many cases the former is the optimal implementation. Based on this understanding, the technical solution of the present disclosure in essence, or parts thereof contributive to the prior art, can be embodied in the form of a software product. The computer software product can be stored in a storage medium (e.g., ROM/RAM, magnetic disk, or optical disc) and includes instructions for causing a terminal device (which may be a mobile phone, a computer, a server, or a network device, etc.) to perform the method described in the various embodiments of the present disclosure.

According to an embodiment of the present disclosure, an apparatus for processing an LBT parameter is also provided. The apparatus can be applied in a first station for implementing the above embodiments and preferred embodiments (details thereof will be omitted here). As used hereinafter, the term "module" can be software, hardware, or a combination thereof, capable of performing a predetermined function. While the apparatuses to be described in the following embodiments are preferably implemented in software, it can be contemplated that they can also be implemented in hardware or a combination of software and hardware.

Figure 3:
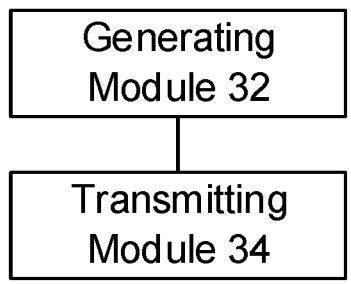
FIG. 3 is a block diagram showing a structure of an apparatus for processing an LBT parameter according to an embodiment of the present disclosure.

FIG. 3 is a block diagram showing a structure of an apparatus for processing an LBT parameter according to an embodiment of the present disclosure. As shown in FIG. 3, the apparatus includes a generating module 32 and a transmitting module 34.

The generating module 32 is configured to generate an LBT parameter including a parameter used by the first station to perform LBT for unlicensed carriers and/or indicating a parameter used by a second station receiving the LBT parameter to perform LBT for the unlicensed carriers. The transmitting module 34 is coupled to the generating module 32 and configured to transmit the LBT parameter.

Figure 4:
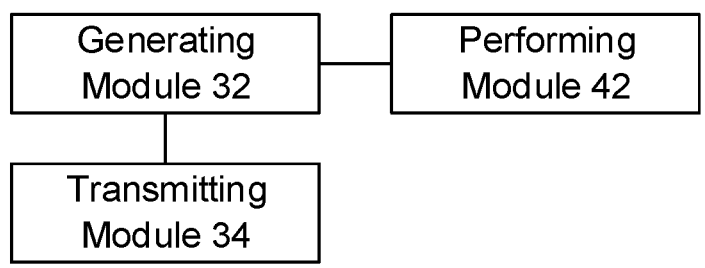
FIG. 4 is a first block diagram showing an optional structure of an apparatus for processing an LBT parameter according to an embodiment of the present disclosure.

FIG. 4 is a first block diagram showing an optional structure of an apparatus for processing an LBT parameter according to an embodiment of the present disclosure. As shown in FIG. 4, optionally, the apparatus can further include a performing module 42 coupled to the generating module 32 and configured to: perform LBT for the unlicensed carriers based on the LBT parameter.

Optionally, the performing module 42 can be configured to: perform LBT based on a cat4 process for an unlicensed carrier having the smallest CW value among the unlicensed carriers and perform LBT based on a cat2 process for other unlicensed carriers than the unlicensed carrier having the smallest CW value among the unlicensed carriers; or perform LBT based on the cat4 process for an unlicensed carrier having the largest CW value among the unlicensed carriers and perform LBT based on the cat2 process for other unlicensed carriers than the unlicensed carrier having the largest CW value among the unlicensed carriers.

Figure 5:
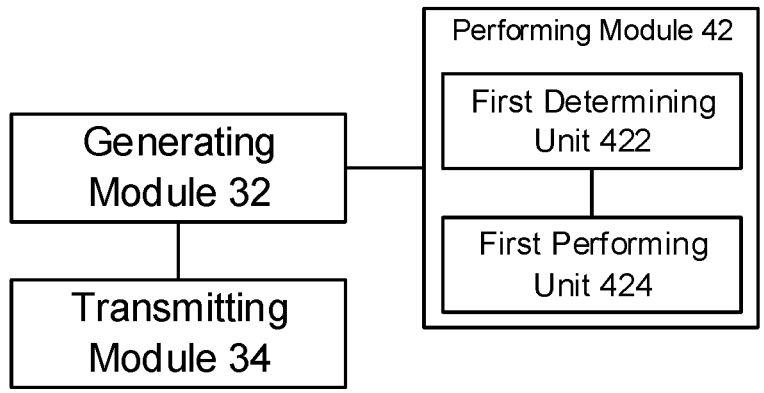
FIG. 5 is a second block diagram showing an optional structure of an apparatus for processing an LBT parameter according to an embodiment of the present disclosure.

FIG. 5 is a second block diagram showing an optional structure of an apparatus for processing an LBT parameter according to an embodiment of the present disclosure. As shown in FIG. 5, optionally, the performing module 42 can include: a first determining unit 422 configured to determine bursts to be aggregated and transmitted over the unlicensed carriers; and a first performing unit 424 coupled to the first determining unit 422 and configured to perform LBT based on a cat4 process for the unlicensed carriers in accordance with a first LBT level corresponding to a first burst having the highest QoS priority among the bursts, or perform LBT based on the cat4 process for the unlicensed carriers in accordance with a second LBT level corresponding to a second burst having the lowest QoS priority among the bursts.

Optionally, the generating module 32 can include: a second determining unit configured to determine, when the LBT parameter includes a Clear Channel Assessment (CCA) energy detection threshold, a CCA energy detection threshold for each of the unlicensed carriers based on a use scheme of the respective unlicensed carriers. The use scheme includes a first use scheme in which the unlicensed carriers are used in a non-CA mode and a second use scheme in which the unlicensed carriers are used in a CA mode.

Optionally, the performing module 42 can include: a second performing unit configured to perform first LBT for the unlicensed carriers. The operation of performing the first LBT includes performing LBT based on a cat4 process for each of the unlicensed carriers individually. Alternatively, the performing module 42 can be configured to transmit the LBT parameter to the second station scheduled by the first station; or transmit the LBT parameter to a plurality of second stations scheduled in one subframe, such that the LBT parameters configured for the second stations have the same CWS, the same random back-off value or the same number of 9 µs time slots in a defer period.

Optionally, the second determining unit can be configured to: determine a first CCA energy detection threshold for a first unlicensed carrier of the unlicensed carriers as $TL=-75+(23-PH)+10\ \log(W)$ or $TL=-73+(23-PH)+10\ \log(W)$, where PH denotes a maximum transmitting power value for the first unlicensed carrier in dBm; and W denotes a bandwidth of the first unlicensed carrier in MHz.

Optionally, the performing module 42 can include: a third performing unit configured to perform second LBT for the unlicensed carriers. The operation of performing the second LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the second determining unit can be configured to: determine a second CCA energy detection threshold for a second unlicensed carrier of the unlicensed carriers as $TL=-75+(23-PH)+10\ \log(W)$ or $TL=-73+(23-PH)+10\ \log(W)$, where PH denotes a maximum total transmitting power value for the unlicensed carriers in dBm; and W denotes a total bandwidth of the unlicensed carriers in MHz.

Optionally, the performing module 42 can include: a fourth performing unit configured to perform the first LBT and the second LBT simultaneously for the unlicensed carriers.

Figure 6:
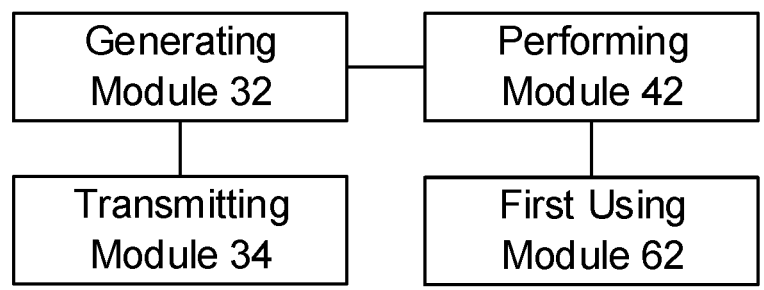
FIG. 6 is a third block diagram showing an optional structure of an apparatus for processing an LBT parameter according to an embodiment of the present disclosure.

FIG. 6 is a third block diagram showing an optional structure of an apparatus for processing an LBT parameter according to an embodiment of the present disclosure. As shown in FIG. 6, optionally, the apparatus can further include: a first using module 62 coupled to the performing module 42 and configured to use an unlicensed carrier for which the first LBT has succeeded among the unlicensed carriers based on the first use scheme or the second use scheme. When the unlicensed carrier for which the first LBT has succeeded among the unlicensed carriers is used based on the second use scheme, a maximum transmitting power value for the unlicensed carrier for which the first LBT has succeeded among the unlicensed carriers is $PH-10\ \log(C)$, where PH denotes a maximum total transmitting power value for the unlicensed carriers in dBm and C denotes a number of the unlicensed carriers.

Figure 7:
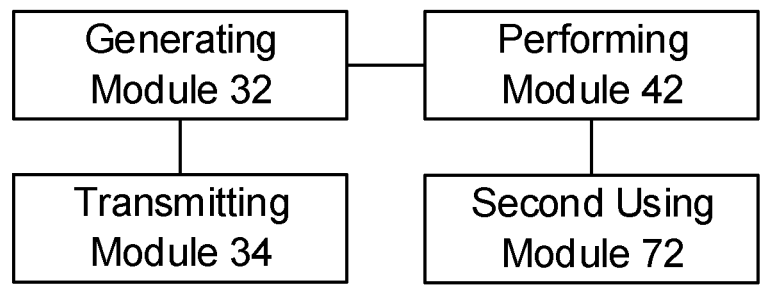
FIG. 7 is a fourth block diagram showing an optional structure of an apparatus for processing an LBT parameter according to an embodiment of the present disclosure.

FIG. 7 is a fourth block diagram showing an optional structure of an apparatus for processing an LBT parameter according to an embodiment of the present disclosure. As shown in FIG. 7, optionally, the apparatus can further include: a second using module 72 coupled to the performing module 42 and configured to use the unlicensed carriers based on the second use scheme when the second LBT for the unlicensed carriers has succeeded. A maximum transmitting power value for each of the unlicensed carriers is $PH-10\ \log(C)$, where PH denotes a maximum total transmitting power value for the unlicensed carriers in dBm and C denotes a number of the unlicensed carriers.

Figure 8:
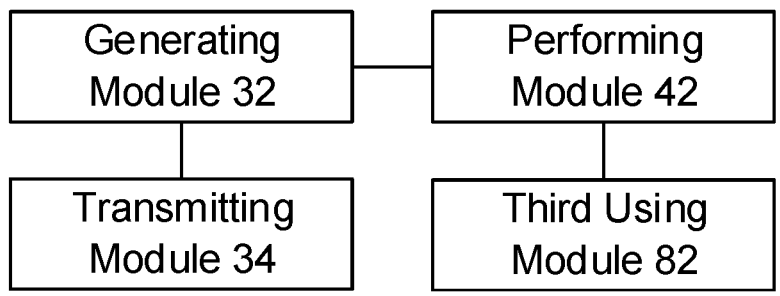
FIG. 8 is a fifth block diagram showing an optional structure of an apparatus for processing an LBT parameter according to an embodiment of the present disclosure.

FIG. 8 is a fifth block diagram showing an optional structure of an apparatus for processing an LBT parameter according to an embodiment of the present disclosure. As shown in FIG. 8, optionally, the apparatus can further include: a third using module 82 coupled to the performing module 42 and configured to use the unlicensed carriers based on the first use scheme when the second LBT for the unlicensed carriers has failed but the first LBT for a part of the unlicensed carriers has succeeded.

Optionally, the performing module 42 can include: a fifth performing unit configured to perform third LBT for the unlicensed carriers. The operation of performing the third LBT includes performing LBT based on a cat4 process for one unlicensed carrier to be used as a primary contention carrier among the unlicensed carriers.

Optionally, the second determining unit can be configured to: determine a third CCA energy detection threshold for the one unlicensed carrier to be used as the primary contention carrier among the unlicensed carriers as $TL=-75+(23-PH)+10\ \log(W)$ or $TL=-73+(23-PH)+10\ \log(W)$, where PH denotes a maximum transmitting power value for the one unlicensed carrier to be used as the primary contention carrier among the unlicensed carriers in dBm; and W denotes a bandwidth of the one unlicensed carrier to be used as the primary contention carrier among the unlicensed carriers in MHz.

Optionally, the performing module 42 can include: a sixth performing unit configured to perform fourth LBT for the unlicensed carriers. The operation of performing the fourth LBT includes performing LBT based on a cat4 process for an unlicensed carrier to be used as a primary contention carrier among the unlicensed carriers and performing LBT based on a cat2 process for an unlicensed carrier to be used as a secondary contention carrier among the unlicensed carriers.

Optionally, the second determining unit can be configured to: determine a fourth CCA energy detection threshold for a fourth unlicensed carrier of the unlicensed carriers as $TL=-75+(23-PH)+10\ \log(W)$ or $TL=-73+(23-PH)+10\ \log(W)$, where PH denotes a maximum total transmitting power value for the unlicensed carriers in dBm; and W denotes a total bandwidth of the unlicensed carriers in MHz.

Optionally, the performing module 42 can include: a seventh performing unit configured to perform the third LBT and the fourth LBT simultaneously for the unlicensed carriers.

Figure 9:
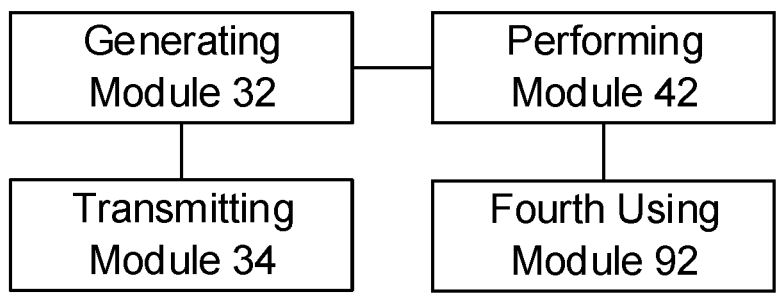
FIG. 9 is a sixth block diagram showing an optional structure of an apparatus for processing an LBT parameter according to an embodiment of the present disclosure.

FIG. 9 is a sixth block diagram showing an optional structure of an apparatus for processing an LBT parameter according to an embodiment of the present disclosure. As shown in FIG. 8, optionally, the apparatus can further include: a fourth using module 92 coupled to the performing module 42 and configured to use the unlicensed carriers based on the second use scheme when the fourth LBT for the unlicensed carriers has succeeded. A maximum transmitting power value for each of the unlicensed carriers is PH−10 log(C), where PH denotes a maximum total transmitting power value for the unlicensed carriers in dBm and C denotes a number of the unlicensed carriers.

Figure 10:
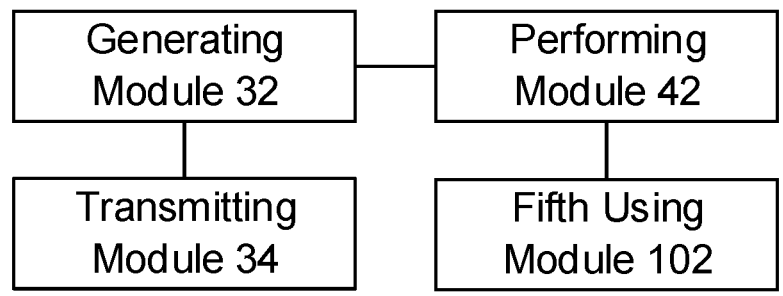
FIG. 10 is a seventh block diagram showing an optional structure of an apparatus for processing an LBT parameter according to an embodiment of the present disclosure.

FIG. 10 is a seventh block diagram showing an optional structure of an apparatus for processing an LBT parameter according to an embodiment of the present disclosure. As shown in FIG. 10, optionally, the apparatus can further include: a fifth using module 102 coupled to the performing module 42 and configured to use the unlicensed carrier to be used as the primary contention carrier among the unlicensed carriers based on the first use scheme when the fourth LBT for the unlicensed carriers has failed but the third LBT for the unlicensed carrier to be used as the primary contention carrier among the unlicensed carriers has succeeded.

It should be noted that each of the above-described modules can be implemented by means of software or hardware, and the latter can be implemented in, but not limited to, the following manner: the above-mentioned modules can be located at the same processor, or can be distributed over a plurality of processors.

According to an embodiment of the present disclosure, a software product is provided. The software can perform the solutions described in the above embodiments and preferred embodiments.

According to an embodiment of the present disclosure, a storage medium is also provided. In this embodiment, the storage medium can be configured to store program codes for the following steps.

At step S202, a first station generates an LBT parameter including a parameter used by the first station to perform LBT for unlicensed carriers and/or indicating a parameter used by a second station receiving the LBT parameter to perform LBT for the unlicensed carriers.

At step S204, the first station transmits the LBT parameter.

Alternatively, in the present embodiment, the above-described storage medium may include, but not limited to, a USB disk, a Read-Only Memory (ROM), a Random Access Memory (RAM), a mobile hard disk, a magnetic disk, an optical disc, or other mediums capable of storing program codes.

In order to describe the embodiments of the present disclosure more clearly, the optional embodiments will be described and explained in the following.

The optional embodiments of the present disclosure provide a method of LBT for multi-carrier aggregation, capable of solving the problem associated with interference due to unlicensed carrier contention by neighboring stations. Also provided is a scheme for determining a CCA energy detection threshold.

Scheme 1

A station (or more generally, a device using unlicensed carriers) transmits a parameter used by the station to perform LBT for unlicensed carriers or a parameter required to be used by a receiver to perform LBT for the unlicensed carriers, via an X2 interface, an S1 interface or an air interface. Here, the parameter may include one or more of a maximum CW value, a minimum CW value, a number of 9 μs CCAs in a defer period, an N value for random back-off, unlicensed carrier information (e.g., carrier identifiers), information on time to start performing LBT, a CCA energy detection threshold, or a predetermined maximum transmitting power.

Scheme 1 can be used for contention for the unlicensed carriers when neighboring stations are configured with frequency reuse. For example, when two stations contend for one unlicensed carrier, the neighboring stations start performing LBT simultaneously based on the information on the time to start performing LBT and using the same LBT configuration parameter. In this way, the two stations can perform LBT simultaneously (with their N values decremented at the same time while the channel is clear) and get access to the channel simultaneously, such that the interference between them can be avoided. This scheme can also be used for contention for adjacent unlicensed carriers, so as to avoid interference between the adjacent unlicensed carriers due to adjacent frequency leakage.

When Station 1 transmits the above LBT information for Station 2 and Station 2 is to contend with Station 1 for one unlicensed carrier, Station 2 can determine to start contending for one unlicensed carrier simultaneously with Station 1 based on the above LBT parameter and determine parameters, such as its detection threshold and transmitting power, based on the CCA detection threshold of Station 1 during the contention process. Station 2 can determine its LBT parameter based on the received LBT parameter or use the same LBT parameter as Station 1 directly.

Alternatively, a base station can configure an LBT parameter for UEs, such that the UEs served by the base station can perform a unified LBT process. For example, the base station configure UEs scheduled in one subframe with the same cat4 CW size, or directly with the same N value, the same number of 9 μs time slots in a defer period, etc. In this case, the unlicensed carrier information and the information on the predetermined maximum transmitting power can be omitted.

Alternatively, when neighboring base stations contend for unlicensed carriers, the base stations can exchange configuration information with each other to allow simultaneous access to one unlicensed carrier or unlicensed carriers at adjacent frequency points, such that the neighboring base stations can be configured with frequency multiplexing. For example, the base stations can exchange their LBT parameters, such as CW sizes and N values for random back-off (including decremented N values), with each other rapidly via an X2 interface. The real-time exchange of the N values advantageously ensures that the base stations can get access to the unlicensed carrier(s) simultaneously.

Alternatively, neighboring base stations can optionally exchange their carrier use schemes with each other, including CA schemes or schemes in which each carrier is transmitted independently. Here, different use schemes have different maximum transmitting powers and different CCA energy detection thresholds. By exchanging the above information between neighboring base stations directly or implicitly, the base station can determine their respective CCA detection thresholds, future transmitting power (depending directly on their respective coverages) and the like when performing LBT, such that the interference between the base stations can be minimized when they are configured with frequency multiplexing.

Scheme 2

When a station contends for a plurality of unlicensed carriers, it performs a cat4 process for contending for the carrier having the smallest CW size while performing a cat2 process for each of the remaining carriers.

Alternatively, when a station contends for a plurality of unlicensed carriers, it performs a cat4 process for contending for the carrier having the largest CW size while performing a cat2 process for each of the remaining carriers.

Scheme 3

When a station is to aggregate and transmit bursts in a plurality of unlicensed carriers, it performs a multi-carrier contention process (e.g., a cat4 process) for unlicensed carrier aggregation in accordance with an LBT level corresponding to the traffic having the highest QoS among the bursts. For example, when there is a primary contention carrier, the LBT level corresponding to the traffic having the highest QoS can be applied in the primary contention carrier.

Alternatively, when a station is to aggregate and transmit bursts in a plurality of unlicensed carriers, it performs a multi-carrier contention process (e.g., a cat4 process) for unlicensed carrier aggregation in accordance with an LBT level corresponding to the traffic having the lowest QoS among the bursts. For example, when there is a primary contention carrier, the LBT level corresponding to the traffic having the lowest QoS can be applied in the primary contention carrier.

Scheme 4

When CA is applied across unlicensed carriers and a station uses an individual operating frequency point for each of the unlicensed carriers, a maximum transmitting power of 23 dBm can be allocated to the unlicensed carrier corresponding to the frequency point, regardless of the bandwidth of the unlicensed carrier.

Power regulation for an unlicensed carrier should be applied in accordance with its frequency point. For example, when a station uses a 40 MHz bandwidth which has only one operating frequency point, the maximum transmitting power for the unlicensed carrier is 23 dBm. When a station uses a 40 MHz bandwidth in which unlicensed carriers having different operating frequency points are aggregated, the maximum transmitting power for the unlicensed carrier at each operating frequency point is 23 dBm. As an example, when two 20 MHz unlicensed carriers are aggregated into one 40 MHz carrier having only one operating frequency, the maximum transmitting power for the 40 MHz carrier is 23 dBm. When there are two operating frequency points over 40 MHz, each corresponding to 20 MHz, the maximum transmitting power for 20 MHz corresponding to each frequency point is 23 dBm.

When a station operating at a plurality of frequency points uses one single Radio Frequency (RF) link, a plurality of unlicensed carriers can use 23 dBm at maximum even if they have different operating frequency points. When a station operating at a plurality of frequency points uses different RF links, the maximum transmitting power for one or more unlicensed carriers in different RF links will be 23 dBm.

In the following, a detection method and a CCA detection threshold for multiple carriers applied in one single station will be explained with reference to some examples.

A station can set a CCA energy detection threshold for each carrier independently or for a set of carriers collectively. The threshold can be determined based on an intended use scheme before the station contends for unlicensed carriers. Here, the use scheme may include e.g., a scheme in which a plurality of accessed unlicensed carriers is used in a CA mode (optionally, aggregated using one operating frequency point or using the frequency point corresponding to each of the unlicensed carriers), e.g., in which each of the accessed unlicensed carriers is transmitted independently, or a scheme in which a non-CA mode is applied. In the following explanation, Schemes 5, 6 and 7 will be given.

Scheme 5

When a station contends for a plurality of unlicensed carriers, two LBT types and their corresponding CCA energy detection thresholds can be as follows.

Type 1: If the contention succeeds, each of the unlicensed carriers is transmitted independently. Let the maximum transmitting power (or a fixed power can be used, as applicable below) of each unlicensed carrier be PH=23 dBm, a CCA energy detection threshold is TL=−62 dBm, calculated as TL=−75+(23−PH)+10 log(W), where PH=23 and W denotes a bandwidth of each unlicensed carrier (e.g., assumed to be 20 MHz). LBT, preferably LBT cat4, is performed for each of the plurality of unlicensed carriers independently.

Type 2: If the contention succeeds, a number of unlicensed carriers will be aggregated for transmission. The maximum total transmitting power is PH=23 dBm and the maximum transmitting power of each unlicensed carrier is P=23-10 log(C)=20 dBm, where C is the number of the aggregated unlicensed carriers (e.g., assumed to be 20 MHz each). The station performs LBT (cat4) for a primary contention unlicensed carrier and fast LBT for a secondary contention unlicensed carrier. A CCA energy detection threshold is TL=−62+3=−59 dBm, calculated as TL=−75+(23−PH)+10 log(W), where PH=23 and W is the total aggregated bandwidth (e.g., assumed to be two 20 MHz carriers).

Optionally, the statin can perform the above Type 1 LBT and Type 2 LBT simultaneously.

Optionally, when the Type 1 LBT has succeeded, the station can allow transmission according to Type 2.

Optionally, when the Type 2 LBT has succeeded, a number of unlicensed carriers are occupied simultaneously, with the maximum transmitting power of each carrier being 20 dBm.

Optionally, if the Type 2 LBT has failed but the Type 1 LBT for a part of the unlicensed carriers has succeeded in the contention, the part of the unlicensed carriers is be occupied, with the maximum transmitting power of each carrier in the part of the unlicensed carriers being 23 dBm.

Scheme 6

When a station contends for a plurality of unlicensed carriers, two LBT types and their corresponding CCA energy detection thresholds can be as follows.

Type 1: It is assumed that only one unlicensed carrier is used as a primary contention carrier and LBT cat4 is performed independently. Assuming that the primary contention carrier is transmitted independently and the maximum transmitting power of the primary contention carrier to be used by the station is PH=23 dBm, a CCA energy detection threshold is TL=−62 dBm, calculated as TL=−75+(23−PH)+10 log(W), where PH=23 and W denotes a bandwidth of each unlicensed carrier (e.g., assumed to be 20 MHz).

Type 2: LBT cat4 is performed for a primary contention carrier and fast LBT is performed for a secondary contention carrier. Assuming that the maximum total transmitting power of the primary contention carrier and the secondary contention carrier is PH=23 dBm, the maximum transmitting power of each unlicensed carrier is P=23-10 log(C)=20 dBm, where C is the number of the aggregated unlicensed carriers (e.g., assumed to be 20 MHz each). A CCA energy detection threshold is TL=−59 dBm, calculated as TL=−75+(23−PH)+10 log(W), where P=23 and W is the total aggregated bandwidth (e.g., assumed to be two 20 MHz carriers).

Optionally, the statin can perform the above Type 1 LBT and Type 2 LBT simultaneously in the primary contention carrier.

Optionally, when the Type 2 LBT has succeeded, two carriers are occupied simultaneously, with the maximum transmitting power of each carrier being 20 dBm.

Optionally, if the Type 2 LBT has failed and the Type 1 LBT for the primary contention carrier has succeeded, the primary contention carrier is occupied. The transmitting power of the primary contention carrier is 23 dBm. Moreover, the secondary contention carrier will not be occupied alone.

Scheme 7

When a station contends for a plurality of unlicensed carriers, two LBT types and their corresponding CCA energy detection thresholds can be as follows.

Type 1: LBT cat4 is performed for each of the plurality of carriers independently. Assuming that the plurality of carriers is aggregated for transmission, the maximum transmitting power of each carrier to be used by the station is PH=20 dBm, a CCA energy detection threshold is TL=−59 dBm, calculated as TL=−75+(23−PH)+10 log(W), where PH=20 and W denotes a bandwidth of each unlicensed carrier (e.g., assumed to be 20 MHz).

Type 2: LBT cat4 is performed for a primary contention carrier and fast LBT is performed for a secondary contention carrier. Assuming that the maximum total transmitting power of the primary contention carrier and the secondary contention carrier is PH=23 dBm, the maximum transmitting power of each unlicensed carrier is P=23-10 log(C)=20 dBm, where C is the number of the aggregated unlicensed carriers (e.g., assumed to be 20 MHz each). A CCA energy detection threshold is TL=−59 dBm, calculated as TL=−75+(23−PH)+10 log(W), where PH=23 and W is the total aggregated bandwidth (e.g., assumed to be two 20 MHz carriers).

Optionally, the statin can perform the above Type 1 LBT and Type 2 LBT simultaneously. Alternatively, the station can perform one of the Type 1 LBT and Type 2 LBT selectively.

Optionally, when the Type 1 LBT processes performed independently for the primary carrier and the secondary carrier have both succeeded, the carriers are occupied simultaneously, with the maximum transmitting power of each carrier being 20 dBm.

Optionally, when the Type 2 LBT has succeeded, the primary contention carrier and the secondary contention carrier are occupied simultaneously, with the maximum transmitting power of each carrier being 20 dBm.

Optionally, if the Type 1 LBT is configured to be performed and the LBT has succeeded for only one carrier, the one carrier is occupied, with the maximum transmitting power of the carrier being 20 dBm. Here, power boosting can be applied, such that the maximum transmitting power of the carrier can be 23 dBm.

With the above schemes, a method is provided for determining and using an energy detection threshold in contention and use of a plurality of unlicensed carriers. In this way, it is possible to flexibly support contention for multiple unlicensed carriers while supporting contention for one single unlicensed carrier. The conventional multi-carrier contention mechanism for unlicensed carriers can be improved, such that multi-carrier contention for unlicensed carriers can be achieved while satisfying the corresponding regulation requirements for the unlicensed carriers.

In the above Schemes 5-7, the station can derive the TL value from its given maximum transmitting power and transmission bandwidth. However, due to factors such as frequency reuse among different nodes, the TL value preferably belongs to a particular range. Alternatively, a particular value in the range can be used directly as the final TL value.

Here, in order to determine the CCA energy detection threshold (CCA-ED TL), the upper and lower limits of TL can be:

Lower limit of CCA-ED $TL$: $TL\text{low}=Q+10\ \log(20)$; and

Upper limit of CCA-ED $TL$: $TL\text{up}=Q+(23-PH)+10\ \log(W)$, where TLlow is the TL value at the maximum transmitting power for one single carrier, the parameter Q can be preferably Q=−73 or Q=−75, or Q can be another value, W is the maximum bandwidth of the carrier for transmission in MHz, with a one-to-one correspondence to the operating frequencies for transmission, and PH is the maximum transmitted power actually transmitted by the station.

In the above Schemes 5-7, the TL values or ranges for the respective carriers can be independent from each other.

For example, when the Q value is −73, assuming that the station has a total bandwidth of 80 MHz and each carrier corresponds to a 20 MHz bandwidth, the upper and lower limits for the TL value corresponding to each carrier or channel can be calculated as:

$TL\text{low}=-73+10\ \log(20)=-60$; and $TL\text{up}=-73+(23-PH)+10\ \log(W)=-37-PH$.

Optionally, the limits are {−60 dBm, −37−PH} for 20 MHz corresponding to the first carrier or channel, {−60 dBm, −37−PH} for 20 MHz corresponding to the second carrier or channel, {−60 dBm, −37−PH} for 20 MHz corresponding to the third carrier or channel, and {−60 dBm, −37−PH} for 20 MHz corresponding to the fourth carrier or channel, where PH is the maximum transmitted power actually transmitted by the station and W is the maximum bandwidth of the carrier for transmission in MHz, with a one-to-one correspondence to the operating frequencies for transmission.

In the above Schemes 5-7, the TL values or ranges for the respective carriers can be similar to those used in a Wireless Fidelity (Wi-Fi) system.

Assuming that the station has a total bandwidth of 160 MHz, the upper and lower limits for the TL value corresponding to each carrier or channel can be calculated as:

$TL\text{low}=-73+10\ \log(20)=-60$; and $TL\text{up}=-73+(23-PH)+10\ \log(W)=-50-PH+10\ \log(W)$.

Optionally, the limits are {−60 dBm, −37−PH} for 20 MHz PCH corresponding to the first carrier or channel, {−60 dBm, −37−PH} for 20 MHz SCH corresponding to the second carrier or channel, {−60 dBm, −34−PH} for 40 MHz SCH corresponding to the third carrier or channel, and {−60 dBm, −31−PH} for 80 MHz PCH corresponding to the fourth carrier or channel, where PH is the maximum transmitted power actually transmitted by the station and W is the maximum bandwidth of the carrier for transmission in MHz, with a one-to-one correspondence to the operating frequencies for transmission.

In the above Schemes 5-7, the TL values or ranges for the respective carriers can be flexibly bound to their bandwidths.

Assuming that the station has a total bandwidth of 160 MHz, the upper and lower limits for the TL value corresponding to each carrier or channel can be calculated as:

$TL\text{low} = -73 + 10\log(20) = -60$; and $TL\text{up} = -73 + (23-PH) + 10\log(W) = -50 - PH + 10\log(W)$.

Optionally, the limits are {−60 dBm, −37−PH} for 20 MHz PCH corresponding to the first carrier or channel, {−60 dBm, −34−PH} for 40 MHz SCH corresponding to the second carrier or channel, {−60 dBm, −37−PH} for 20 MHz SCH corresponding to the third carrier or channel, and {−60 dBm, −31−PH} for 80 MHz SCH corresponding to the fourth carrier or channel, where PH is the maximum transmitted power actually transmitted by the station and W is the maximum bandwidth of the carrier for transmission in MHz, with a one-to-one correspondence to the operating frequencies for transmission.

In the above Schemes 5-7, the TL values or ranges for the respective carriers can be based on equal or unequal power.

Here, in this example, the TL values or ranges for the respective carriers are independent from each other. The calculations in this example also apply to the situations in which the TL values or ranges for the respective carriers are similar to those used in a Wi-Fi system or in which the TL values or ranges for the respective carriers are flexibly bound to their bandwidths, and further details thereof will be omitted here.

Assuming that the maximum transmitting power of the station is 23 dBm, for equal power allocation, PH=17 dBm for each carrier or channel. Optionally, the limits are {−60 dBm, −54 dBm} for 20 MHz corresponding to the first carrier or channel, {−60 dBm, −54 dBm} for 20 MHz corresponding to the second carrier or channel, {−60 dBm, −54 dBm} for 20 MHz corresponding to the third carrier or channel, and {−60 dBm, −54 dBm} for 20 MHz corresponding to the fourth carrier or channel.

Assuming that the maximum transmitting power of the station is 23 dBm, for unequal power allocation, the PH values for the respective carriers or channels are 20 dBm, 17 dBm, 14 dBm and 14 dBm. It is to be noted that the unequal power values here are exemplary only and could be other values.

Optionally, the limits are {−60 dBm, −57 dBm} for 20 MHz corresponding to the first carrier or channel, {−60 dBm, −54 dBm} for 20 MHz corresponding to the second carrier or channel, {−60 dBm, −51 dBm} for 20 MHz corresponding to the third carrier or channel, and {−60 dBm, −51 dBm} for 20 MHz corresponding to the fourth carrier or channel.

All or part of the different schemes described above in this embodiment can be combined, provided that the different examples do not conflict. In the Equation $TL = -75 + (23-PH) + 10\log(W)$ in Schemes 5-7, −75 can be replaced with −73 in the calculations.

Scheme 8

In an optional embodiment of the present disclosure, a method for adjusting a CW for one or more unlicensed carriers is provided. It can be used in contention for one single unlicensed carrier, or in contention for unlicensed carriers when a plurality of carriers are aggregated. In the following, the method will be described as applied in a base station. It is to be noted here that the method can also be applied in a UE.

Figure 11:
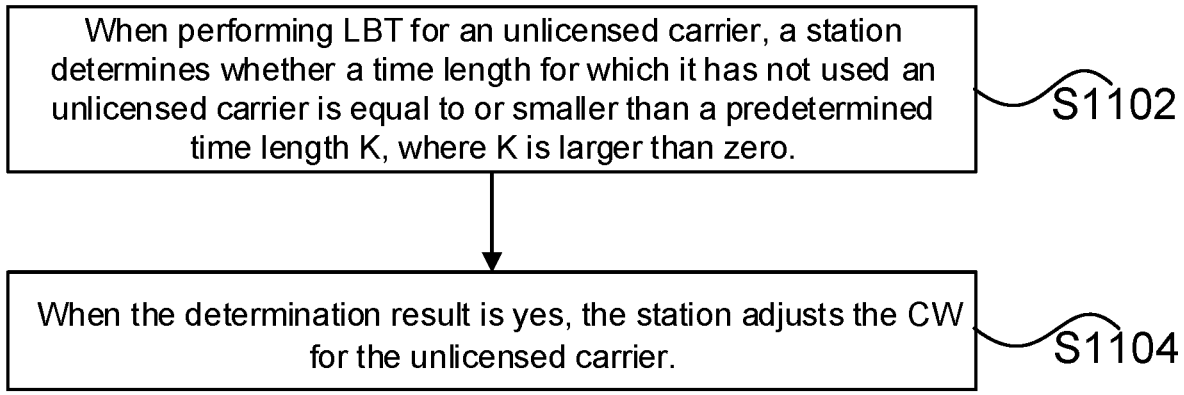
FIG. 11 is a flowchart illustrating a method for adjusting a CW according to an optional embodiment of the present disclosure.

FIG. 11 is a flowchart illustrating a method for adjusting a CW according to an optional embodiment of the present disclosure. As shown in FIG. 11, the method includes the following steps.

At step S1102, when performing LBT for an unlicensed carrier, a station determines whether a time length for which it has not used an unlicensed carrier is equal to or smaller than a predetermined time length K, where K is larger than zero.

At step S1104, when the determination result is yes, the station adjusts the CW for the unlicensed carrier.

Optionally, when the determination result is no, the method can further include a step in which the station performs LBT using a CW having a predefined length or the same length as the last CW.

With the above steps, when a base station (or a UE) performs LBT, the base station determines the time length for which it has not used Unlicensed Carrier 1 for data transmission (or the time length for which it has not used Unlicensed Carrier 1). When the time length is smaller than (or equal to) K, the base station proceeds with A; otherwise it proceeds with B.

A. The base station adjusts the current CWS based on one or more reference subframes for which valid Hybrid Automatic Repeat reQuest (HARQ)-Acknowledgement (ACK) feedback information was received within the time length K before the current LBT.

Alternatively, the base station adjusts the current CWS based on one or more reference subframes for which valid HARQ-ACK feedback information was received within the time length K but not within a time length K1 before the current LBT.

B. The base station uses a default CWS (e.g., the minimum CW) or the last CW.

Optionally, the station adjusting the CW for the unlicensed carrier includes: the station adjusts the CW based on the HARQ-ACK feedback information for the reference subframe(s).

Optionally, the reference subframe(s) can include one of: one or more subframes corresponding to the valid HARQ-ACK feedback information received within the time length K before performing the LBT; or one or more subframes corresponding to the valid HARQ-ACK feedback information received within a time length smaller than K but larger than K1 before performing the LBT, where O<K1<K.

Optionally, the operation of adjusting the CW based on the HARQ-ACK feedback information for the reference subframe(s) includes: increasing the length of the CW when the proportion of Non-Acknowledgement (NACK) in the HARQ-ACK feedback information is larger than or equal to a predefined proportion, P; or decreasing the length of the CW when the proportion of NACK in the HARQ-ACK feedback information is smaller than the predefined proportion P.

Optionally, the station decreasing the length of the CW includes the station adjusting the length of the CW to a predefined length, e.g., the minimum CW.

Optionally, the predefined proportion P can have one of the following values: 10%, 50%, 75% or 100%.

Optionally, the value of K can be a constant value.

Optionally, the value of K can be determined based on contention fairness and/or a desired contention probability. For example, the value of K can be obtained from simulations. For example, K is mainly dependent on two factors: the contention fairness and the desired contention probability. Hence, for a given system in which the contention fairness and the desired contention probability are given, the specific value of K can be determined from simulations.

Optionally, the value of K can be selected by the station from a set of predefined K values.

Optionally, the value of K can be exchanged between the station and another station via an S1 interface, an X2 interface and/or an air interface.

Optionally, before determining whether the time length for which it has not used the unlicensed carrier is equal to or smaller than the predefined time length K, the station receives a K value of another station transmitted from the other station and set the value of K for the station to be equal to the K value of the other station. In this way, when the K values are exchanged between different base stations, a secondary base station can set its K value to be equal to the received K value of a primary base station.

Optionally, the above reference subframe(s) may include, but not limited to, one of the following:

1. The first or last subframe among subframes corresponding to the received HARQ-ACK feedback information.
2. All subframes corresponding to the received HARQ-ACK feedback information.
3. The last subframe in the last downlink (DL) bursts received before performing LBT and within the time length K.
4. The first subframe in the last DL bursts received before performing LBT and within the time length K.
5. The subframe corresponding to the last valid HARQ-ACK feedback information received before performing LBT and within the time length K.
6. The subframe corresponding to the last valid HARQ-ACK feedback information received before performing LBT and within the time length smaller than K but larger than K1.
7. A plurality of subframes in one DL burst before performing LBT and within the time length K.
8. A plurality of subframes in a plurality of DL bursts corresponding to the HARQ-ACK feedback information received before performing LBT and within the time length K.
9. A plurality of subframes in the last at least two of the plurality of DL bursts corresponding to the HARQ-ACK feedback information received before performing LBT and within the time length K.
10. One subframe in the last at least two of the plurality of DL bursts corresponding to the HARQ-ACK feedback information received before performing LBT and within the time length K. For example, one subframe in the last at least two DL bursts within the time length K can be used as a subframe in Item A. For example, in a regulated region having a maximum occupation time length of 4 ms, since the HARQ-ACK feedback in the LTE system takes 4 ms, when the base station performs LBT immediately after the last burst in the time length K, it could not receive the HARQ-ACK feedback corresponding to the burst. Thus, it has to be the last at least two DL bursts (the number 2 is exemplary only and any number larger than 1, e.g., 3 or 4, is possible) such that the scheme can be feasible.
11. A plurality of subframes in the last one of the plurality of DL bursts corresponding to the HARQ-ACK feedback information received before performing LBT and within the time length K.
12. A plurality of subframes in the last at least two bursts corresponding to the HARQ-ACK feedback information received before performing LBT and within the time length K.

Optionally, when the base station has a DL transmission within the time length K but the HARQ-ACK feedback corresponding to the DL transmission has not been transmitted by the receiver timely, the base station can use the last CW or a default CW (e.g., the minimum CW). For example, after the base station has transmitted DL bursts in the last 1, 2, 3 or 4 subframes within the time length K, when the base station performs the current LBT and the receiver has not transmitted the HARQ-ACK corresponding to the DL bursts, the base station determines that no HARQ-ACK information has been received and does not consider these subframes in HARQ-ACK statistics. This is because it takes some time for the receiver to receive and process the DL bursts. For example, since the processing time of 4 ms is required in the LTE specification, the HARQ-ACK feedback information corresponding to the DL burst transmitted at 0 ms will be received at 4 ms or later.

Optionally, the value of K is larger than or equal to a time length of one DL burst.

Optionally, the value of K is a multiple of a maximum time length for which an unlicensed carrier can be occupied for one time as predefined in the system or specified for a region (e.g., the maximum time length for which an unlicensed carrier can be occupied for one time in a 5 GHz frequency band as specified in Europe is 13 ms). For example, the value of K can be configured to be a number of times larger than the maximum time length for which an unlicensed carrier can be occupied for one time as specified by the system or by a regional law. For example, when the specified maximum time length is 13 ms, the value of K can be larger than or equal to m*13, where m is larger than or equal to 3. For example, when the system specified maximum time length is 10 ms, the value of K can be larger than or equal to m*10, where m is larger than or equal to 3. As another example, when the system specified maximum time length is 4 ms, the value of K can be larger than or equal to m*4, where m is larger than or equal to 3.

Optionally, the value of K1 may be different for different systems. For example, K1 can be 4 ms for the LTE system.

The above Schemes 1-8 can be combined.

Furthermore, the above Scheme 8 can be further described as follows.

In an optional embodiment of the present disclosure, a method for adjusting a CW for one or more unlicensed carriers is provided. It can be used in contention for one single unlicensed carrier, or in contention for unlicensed carriers when a plurality of carriers are aggregated.

When a base station (or a UE) performs LBT, the base station determines the time length for which it has not used Unlicensed Carrier 1 for data transmission (or the time length for which it has not used Unlicensed Carrier 1). When the time length is smaller than (or equal to) K, the base station proceeds with A; otherwise it proceeds with B.

A. The base station adjusts the current CWS based on one or more reference subframes for which HARQ-ACK feedback information was received (valid) within the time length K before the current LBT.

Alternatively, the base station adjusts the current CWS based on one or more reference subframes for which HARQ-ACK feedback information was received (valid) within the time length K but not within a time length K1 before the current LBT.

B. The base station uses a default CWS (e.g., the minimum CW) or the last CW.

Optionally, the CWS can be adjusted based on the HARQ-ACK feedback information. In particular, if at least P % of the received HARQ-ACK feedback information is NACK, the station increases the length of the CW; otherwise it sets the CW as the minimum CW. Here, P % can be one of {10%, 50%, 75%, 100%}.

Optionally, the value of K can be a constant value. The value of K can be obtained from simulations. For example, K is mainly dependent on two factors: the contention fairness and the desired contention probability. Hence, for a given system in which the contention fairness and the desired contention probability are given, the specific value of K can be determined from simulations.

Optionally, a set of K values can be configured by the system and the station can select one value from the set and configure it as the K value for the base station.

Optionally, the value of K can be exchanged between different base stations via an S1 interface and an X2 interface.

Optionally, when the K values are exchanged between different base stations, a secondary base station can set its K value to be equal to the received K value of a primary base station.

Optionally, the one subframe in Item A as described above can be HARQ-ACK in the first or last received subframe.

Optionally, the subframes in Item A as described above can be all subframes for which HARQ-ACK is received.

Optionally, the last subframe in Item A as described above can be in the last DL burst within the time length K.

Optionally, the one subframe in Item A as described above can be the first subframe in the last DL burst received within the time length K.

Optionally, the one subframe in Item A as described above can be the last subframe for which a valid HARQ-ACK is received within the time length K from the time at which the base station starts performing LBT this time.

Optionally, the one subframe in Item A as described above can be the last subframe for which a valid HARQ-ACK is received within the time length K but not within the time length K1 from the time at which the base station starts performing the current LBT.

Optionally, when the base station has a DL transmission within the time length K but the HARQ-ACK feedback corresponding to the DL transmission has not been transmitted by the receiver timely, the base station can use the last CW or a default CW (e.g., the minimum CW). For example, after the base station has transmitted DL bursts in the last 1, 2, 3 or 4 subframes within the time length K, when the base station performs the current LBT and the receiver has not transmitted the HARQ-ACK corresponding to the DL bursts, the base station determines that no HARQ-ACK information has been received and does not consider these subframes in HARQ-ACK statistics. This is because it takes some time for the receiver to receive and process the DL bursts. For example, since the processing time of 4 ms is required in the LTE specification, the HARQ-ACK feedback information corresponding to the DL burst transmitted at 0 ms will be received at 4 ms or later.

Optionally, the value of K1 may be different for different systems. For example, K1 can be 4 ms for the LTE system.

Optionally, the subframes in Item A as described above can be a plurality of subframes in one DL burst within the time length K.

Optionally, the subframes in Item A as described above can be a plurality of subframes in a plurality of DL bursts for which HARQ-ACK is received within the time length K.

Optionally, when the subframes in Item A as described above are distributed over in a plurality of DL bursts within the time length K, preferably a plurality of subframes in the last one of the plurality of DL bursts can be used as the subframes in Item A.

Optionally, when the subframes in Item A as described above are distributed over in a plurality of DL bursts within the time length K, preferably a plurality of subframes in the last at least two of the plurality of DL bursts can be used as the subframes in Item A.

Optionally, preferably a plurality of subframes in the last at least two DL bursts within the time length K can be used as the subframes in Item A.

Optionally, preferably one subframe in the last at least two DL bursts within the time length K can be used as the one subframe in Item A. For example, in a regulated region having a maximum occupation time length of 4 ms, since the HARQ-ACK feedback in the LTE system takes 4 ms, when the base station performs LBT immediately after the last burst in the time length K, it could not receive the HARQ-ACK feedback corresponding to the burst. Thus, it has to be the last at least two DL bursts (the number 2 is exemplary only and any number larger than 1, e.g., 3 or 4, is possible) such that the scheme can be feasible.

Optionally, the value of K can be configured to be larger than or equal to a time length of one DL burst.

Optionally, the value of K can be configured as a multiple of a maximum time length for one occupation as predefined in the system or specified for a region. For example, when the specified maximum time length is 13 ms, the value of K can be larger than or equal to m*13, where m is larger than or equal to 3. For example, when the system specified maximum time length is 10 ms, the value of K can be larger than or equal to m*10, where m is larger than or equal to 3. As another example, when the system specified maximum time length is 4 ms, the value of K can be larger than or equal to m*4, where m is larger than or equal to 3.

According to an embodiment of the present disclosure, an apparatus for adjusting a CW is also provided. The apparatus can be applied in a station for implementing the above embodiments and preferred embodiments (details thereof will be omitted here). As used hereinafter, the term "module" can be software, hardware, or a combination thereof, capable of performing a predetermined function. While the apparatuses to be described in the following embodiments are preferably implemented in software, it can be contemplated that they can also be implemented in hardware or a combination of software and hardware.

Figure 12:
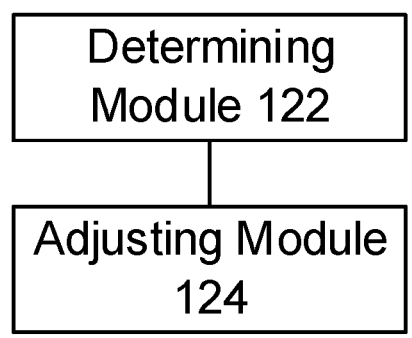
FIG. 12 is a block diagram showing a structure of an apparatus for adjusting a CW according to an optional embodiment of the present disclosure.

FIG. 12 is a block diagram showing a structure of an apparatus for adjusting a CW according to an optional embodiment of the present disclosure. As shown in FIG. 12, the apparatus can be applied in a station (e.g., a base station or a UE). The apparatus includes: a determining module 122 and an adjusting module 124.

The determining module 122 is configured to determine, when performing LBT for an unlicensed carrier, whether a time length for which it has not used an unlicensed carrier is equal to or smaller than a predetermined time length K, where K is larger than zero.

The adjusting module 124 is coupled to the determining module 122 and configured to adjust, when the determination result is yes, the CW for the unlicensed carrier.

It can be appreciated by those skilled in the art that the above-described modules or steps of the present disclosure can be implemented by a general purpose computing device, and can be centralized at one single computing device or distributed over a network of multiple computing devices. Optionally, they can be implemented by means of computer executable program codes, which can be stored in a storage device and executed by one or more computing devices. In some cases, the steps shown or described herein may be performed in an order different from the one described above. Alternatively, they can be implemented separately in individual integrated circuit modules, or one or more of the modules or steps can be implemented in one single integrated circuit module. Thus, the present disclosure is not limited to any particular hardware, software, and combination thereof.

The foregoing is merely illustrative of the preferred embodiments of the present disclosure and is not intended to limit the present disclosure. Various changes and modifications may be made by those skilled in the art. Any modifications, equivalent alternatives or improvements that are made without departing from the spirits and principles of the present disclosure are to be encompassed by the scope of the present disclosure.

INDUSTRIAL APPLICABILITY

As described above, the embodiments of the present disclosure provide a method for processing an LBT parameter, a method for adjusting a contention window and associated apparatuses and have the following advantageous effects. A first station generates an LBT parameter including a parameter used by the first station to perform LBT for unlicensed carriers and/or indicating a parameter used by a second station receiving the LBT parameter to perform LBT for the unlicensed carriers. The first station transmits the LBT parameter. With the embodiments of the present disclosure, the problem associated with interference due to unlicensed carrier contention by neighboring stations can be solved, such that the interference between the neighboring stations due to unlicensed carrier contention by the neighboring stations can be avoided.

What is claimed is:

1. A method for wireless communication, comprising:
generating, by a base station, a parameter for facilitating an access to unlicensed carriers by a User Equipment (UE), the parameter indicating at least a maximum Contention Window (CW) value, a minimum CW value, and an integer representing a multiple of 9 µs time slots in a defer period to enable the UE to adjust a contention window for the access to the unlicensed carriers, the integer being greater than 1; and
transmitting, by the base station, the parameter to the UE.

2. The method of claim 1, comprising:
determining, by the base station, an energy detection threshold for each of the unlicensed carriers.

3. An apparatus for wireless communication, comprising:
a processor, and
a memory including processor executable code, wherein the processor executable code upon execution by the processor configures the processor to:
generate a parameter for facilitating an access to unlicensed carriers, the parameter indicating at least a maximum Contention Window (CW) value, a minimum CW value, and an integer representing a multiple of 9 µs time slots in a defer period to enable a User Equipment (UE) to adjust a contention window for the access to the unlicensed carriers the integer being greater than 1; and
transmit the parameter to the UE.

4. The apparatus of claim 3, wherein the processor is configured to determine an energy detection threshold for each of the unlicensed carriers.

5. A non-transitory computer storage medium having code stored thereon, the code when executed by a processor, causing the processor to implement a method that comprises:
generating, by a base station, a parameter for facilitating an access to unlicensed carriers by a User Equipment (UE), the parameter indicating at least a maximum Contention Window (CW) value, a minimum CW value, and an integer representing a multiple of 9 µs time slots in a defer period to enable the UE to adjust a contention window for the access to the unlicensed carriers, the integer being greater than 1;
transmitting, by the base station, the parameter to the UE.

6. The non-transitory computer storage medium of claim 5, wherein the method comprises determining, by the base station, an energy detection threshold for each of the unlicensed carriers.

7. A method for wireless communication, comprising:
receiving, at a User Equipment (UE), a parameter from a base station, the parameter indicating at least a maximum Contention Window (CW) value, a minimum CW value, and an integer representing a multiple of 9 µs time slots in a defer period for facilitating an access to unlicensed carriers, the integer being greater than 1;
adjusting, by the UE, a contention window based on the parameter; and
performing, by the UE, an access mechanism based on the contention window to access the unlicensed carriers.

8. The method of claim 7, comprising:
determining, by the UE, an energy detection threshold for an unlicensed carrier of the unlicensed carriers based on a bandwidth of the unlicensed carrier in MHz.

9. An apparatus for wireless communication, comprising:
a processor; and
a memory including processor executable code, the processor executable code when executed by the processor causes the processor to:
receive a parameter from a base station, the parameter indicating at least a maximum Contention Window (CW) value, a minimum CW value, and an integer representing a multiple of 9 µs time slots in a defer period for facilitating an access to unlicensed carriers, the integer being greater than 1;
adjust a contention window based on the parameter; and
perform an access mechanism based on the contention window to access the unlicensed carriers.

10. The apparatus of claim 9, wherein the processor is configured to determine an energy detection threshold for an unlicensed carrier of the unlicensed carriers based on a bandwidth of the unlicensed carrier in MHz.

11. A non-transitory computer storage medium having code stored thereon, the code when executed by a processor, causing the processor to implement a method that comprises:
receiving, at a User Equipment (UE), a parameter from a base station, the parameter indicating at least a maximum Contention Window (CW) value, a minimum CW value, and an integer representing a multiple of 9 µs time slots in a defer period for facilitating an access to unlicensed carriers, the integer being greater than 1;
adjusting, by the UE, a contention window based on the parameter; and
performing, by the UE, an access mechanism based on the contention window to access the unlicensed carriers.

12. The non-transitory computer storage medium of claim 11, wherein the method comprises determining, by the UE, an energy detection threshold for an unlicensed carrier of the unlicensed carriers based on a bandwidth of the unlicensed carrier in MHz.

* * * * *